United States Patent
Li et al.

(10) Patent No.: US 9,883,540 B2
(45) Date of Patent: Jan. 30, 2018

(54) MULTIPLE USERS COOPERATIVE COMMUNICATION METHOD, AND RELATED DEVICE AND SYSTEM

(71) Applicant: Huawei Technologies Co., Ltd., Shenzhen, Guangdong (CN)

(72) Inventors: Yue Li, Shenzhen (CN); Xiaolong Guo, Beijing (CN); Fei Yang, Shenzhen (CN); Song Zhu, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 141 days.

(21) Appl. No.: 14/712,447

(22) Filed: May 14, 2015

(65) Prior Publication Data

US 2015/0250013 A1 Sep. 3, 2015

Related U.S. Application Data

(63) Continuation of application No. PCT/CN2012/084577, filed on Nov. 14, 2012.

(51) Int. Cl.
*H04W 76/02* (2009.01)
*H04L 5/00* (2006.01)
(Continued)

(52) U.S. Cl.
CPC ......... *H04W 76/023* (2013.01); *H04L 5/0035* (2013.01); *H04W 36/0033* (2013.01);
(Continued)

(58) Field of Classification Search
CPC ........... H04W 76/023; H04W 72/0426; H04W 36/0033; H04W 92/20; H04W 52/42; H04L 5/0035; H04B 7/024
See application file for complete search history.

(56) References Cited

U.S. PATENT DOCUMENTS

2002/0110096 A1 8/2002 Carlsson et al.
2009/0252098 A1 10/2009 Do et al.
(Continued)

FOREIGN PATENT DOCUMENTS

CN 101039526 A 9/2007
CN 101243655 A 8/2008
(Continued)

OTHER PUBLICATIONS

Ferragut et al., Traffic and Mobility Management in Networks of Femtocells published Aug. 11, 2012.*

*Primary Examiner* — Ian N Moore
*Assistant Examiner* — Justin T Van Roie

(57) ABSTRACT

The present invention discloses a multiple users cooperative communication (MUCC) method and system. The main idea of the present invention is as follows: through multiple users cooperative communication between APs, data to be sent to a UE by an eNB may be sent to a support AP at first, and then the support AP sends the data to the UE; and when the support AP is in a poor network environment, the eNB may send the data to other APs near the support AP, and finally forward the data to the support AP through one or more times of forwarding between other APs. The present invention has a multiuser diversity gain without increasing the complexity and power consumption of the UE; furthermore, a laying cost of wired backhaul can be reduced and reliability and transmission efficiency of MUCC can be improved.

12 Claims, 21 Drawing Sheets

(51) Int. Cl.
*H04W 72/04* (2009.01)
*H04W 36/00* (2009.01)
*H04W 52/42* (2009.01)
*H04W 92/20* (2009.01)

(52) U.S. Cl.
CPC ....... *H04W 52/42* (2013.01); *H04W 72/0426* (2013.01); *H04W 92/20* (2013.01)

(56) References Cited

U.S. PATENT DOCUMENTS

| | | | |
|---|---|---|---|
| 2011/0176477 A1* | 7/2011 | Lee | H04B 7/15592 |
| | | | 370/315 |
| 2012/0230255 A1 | 9/2012 | Li et al. | |
| 2013/0223272 A1* | 8/2013 | Tao | H04B 7/024 |
| | | | 370/252 |
| 2014/0146721 A1 | 5/2014 | Yarvis et al. | |

FOREIGN PATENT DOCUMENTS

| | | | | |
|---|---|---|---|---|
| CN | 101909286 A | 12/2010 | | |
| CN | 102244913 A | 11/2011 | | |
| WO | WO 2011123809 A1 * | 10/2011 | ........... | H04L 1/1812 |
| WO | WO 2012062166 A1 * | 5/2012 | ............. | H04B 7/024 |

\* cited by examiner

MULTIPLE USERS COOPERATIVE COMMUNICATION METHOD, AND RELATED DEVICE AND SYSTEM

CROSS-REFERENCE TO RELATED APPLICATION

This application is a continuation of International Application No. PCT/CN2012/084577, filed on Nov. 14, 2012, which is hereby incorporated by reference in its entirety.

TECHNICAL FIELD

The present invention relates to the field of communications, and in particular, to a multiple users cooperative communication method, and a related device and system.

BACKGROUND

With the rapid development of the mobile communication technologies, there have been various types of mobile communication systems at present, for example, a Global System for Mobile Communication (GSM) network, a General Packet Radio Service (General Packet Radio Service, GPRS) network, a Wideband Code Division Multiple Access (WCDMA) network, a CDMA-2000 (Code Division Multiple Access) network, a time division-synchronous code division multiple access (TD-SCDMA) network, a Worldwide Interoperability for Microwave Access (WiMAX) network, and so on. In addition to voice communication services, these mobile communication systems can also provide data communication services. A user may upload and download various kinds of data by using data communication services provided by these mobile communication systems. Among these communication systems, with respect to the means of communication for single-user equipment, the throughput rate or reliability of data transmission of a user equipment will drop sharply once the network environment of the user equipment is degraded.

To solve the above problem, a concept of multiple users cooperative communication (MUCC) is proposed. For the MUCC, data sent to a user equipment (UE) by an evolved NodeB (evolved Node B, eNB) may be sent to other UEs near this UE, and then the data is forwarded to the target UE through the short-distance communication technology between UEs. By using MUCC, when sending data to UE, the eNB may select a UE having the best channel conditions from several UEs to deliver data, thereby achieving an effect of multiuser diversity. However, the MUCC may also cause the problems that overhead on macro-network air interface links of a UE cannot be saved, and complexity and power consumption of the UE is increased, and the like.

The above defects of the MUCC are particularly important for small data transmission. Therefore, in view of characteristics of the small data transmission, another form of the MUCC is derived: MUCC Form 2. In the MUCC Form 2, a UE and an eNB do not communicate with each other directly. Data sent by the eNB to all benefited UEs are forwarded by a support UE. A UE providing support for a benefited UE may be a super E5 (a super E5 refers to a special terminal particularly for supporting another UE) or a common terminal Forwarding by the support UE may increase the edge coverage of the eNB and improve the spectrum efficiency of some hot spots. Technologies similar to MUCC Form 2 further include pico, and relay, and the like. However, they have the following defects: MUCC Form 2 loses a multiuser diversity gain, and when the macro-network link of a common support UE become worse, all UEs connected to this support UE will be affected; the backhaul (backhaul link) of a small station in the pico needs to be installed with fixed network lines, and the laying cost of optical fibers and other wired backhaul is high; and, although a common support node in the relay and MUCC Fond 2 supports wireless backhaul, it is likely to form a bottleneck for the backhaul.

In conclusion, the existing MUCC technology has problems of having a complicated structure, high power consumption, low reliability of communication.

SUMMARY

A technical problem to be solved in the present invention is to provide a multiple users cooperative communication method and a related device and system, where a UE thereof has a simple structure, low power consumption, and high reliability of communication.

A first aspect of the present invention provides a multiple users cooperative communication method, including:

sending, by an evolved NodeB eNB, a message at least containing cooperative layer configuration information and cooperative bearer configuration information of a current support AP to the current support access point AP of a benefited UE, so that the current support AP configures its own cooperative layer and cooperative bearer according to the cooperative layer configuration information and cooperative bearer configuration information of the current support AP;

sending, by the eNB, identifier and/or address information of the benefited UE to current related APs, where the current related APs refer to at least one AP that performs multiple users cooperative communication with the current support AP;

sending, by the eNB, a message containing cooperative layer configuration information of the benefited UE to the benefited UE, so that the benefited UE configures its own cooperative layer according to the cooperative layer configuration information of the benefited UE; and delivering, by the eNB, data to the current related APs, so that the current related APs forward the data to the current support AP according to the identifier and/or address information of the benefited UE, and the current support AP sends the data to the benefited UE.

In a first possible implementation manner, the method further includes:

detecting, by the eNB, whether the benefited UE moves to a new support AP, if yes:

sending, by the eNB, a message at least containing cooperative layer configuration information and cooperative bearer configuration information of the new support AP to the new support AP, so that the new support AP configures its own cooperative layer and cooperative bearer according to the cooperative layer configuration information and cooperative bearer configuration information of the new support AP;

sending, by the eNB, the identifier and/or address information of the benefited UE to new related APs, where the new related APs refer to at least one AP that performs multiple users cooperative communication with the new support AP;

sending, by the eNB, a message containing cooperative layer update information of the benefited UE to the benefited UE, so that the benefited UE updates its own cooperative layer according to the cooperative layer update information of the benefited UE; and delivering, by the eNB, data to the new related APs, so that the new related APs forward the data to the new support AP according to the identifier and/or address information of the benefited UE, and the new support AP sends the data to the benefited UE.

With reference to the first possible implementation manner in the first aspect of the present invention, in a second possible implementation manner, the method further includes:

sending, by the eNB, a message containing cooperative layer and cooperative bearer delete information of the current support AP to the current support AP, so that the current support AP deletes its own cooperative layer and cooperative bearer configurations; and sending, by the eNB, a message containing information for deleting the identifier and/or address information of the benefited UE to the current related APs, so that the current related APs delete the identifier and/or address information of the benefited UE.

With reference to the second possible implementation manner in the first aspect of the present invention, in a third possible implementation manner, if the new related APs have a same part of APs as the current related APs, the sending, by the eNB, a message containing information for deleting the identifier and/or address information of the benefited UE to the current related APs, so that the current related APs delete the identifier and/or address information of the benefited UE, includes:

sending, by the eNB, the message containing the information for deleting the identifier and/or address information of the benefited UE to a part of APs that are in the current related APs and different from the new related APs, so that the part of APs that are in the current related APs and different from the new related APs delete the identifier and/or address information of the benefited UE.

With reference to the second possible implementation manner in the first aspect of the present invention, in a fourth possible implementation manner, if the new related APs are different from each AP in the current related APs, the sending, by the eNB, a message containing information for deleting the identifier and/or address information of the benefited UE to the current related APs, so that the current related APs delete the identifier and/or address information of the benefited UE, includes:

sending, by the eNB, the message containing the information for deleting the identifier and/or address information of the benefited UE to each AP in the current related APs, so that each AP in the current related APs deletes the identifier and/or address information of the benefited UE.

A second aspect of the present invention provides a multiple users cooperative communication method, including:

receiving, by a support access point AP, a message that at least contains cooperative layer configuration information and cooperative bearer configuration information of the support AP and is sent by an evolved NodeB eNB;

configuring, by the support AP, its own cooperative layer and cooperative bearer according to the cooperative layer configuration information and cooperative bearer configuration information of the support AP; and receiving, by the support AP, data forwarded by related APs, and sending the data to a benefited UE, where the related APs refer to at least one AP that performs multiple users cooperative communication with the support AP.

In a first possible implementation manner, the method further includes:

receiving, by the support AP, a message that contains cooperative layer and cooperative bearer delete information of the support AP and is sent by the eNB, and deleting the configured cooperative layer and cooperative bearer according to the cooperative layer and cooperative bearer delete information of the support AP.

A third aspect of the present invention provides a multiple users cooperative communication method, including:

receiving, by related access points APs, identifier and/or address information of a benefited UE sent by an evolved NodeB eNB, where the related APs refer to at least one AP that performs multiple users cooperative communication with a support AP of the benefited UE;

receiving, by the related APs, data sent by the eNB; and forwarding, by the related APs, the data to the support AP according to the identifier and/or address information of the benefited UE, so that the support AP sends the data to the benefited UE.

In a first possible implementation manner, the forwarding, by the related APs, the data to the support AP according to the identifier and/or address information of the benefited UE, includes:

directly forwarding, by any AP receiving the data in the related APs, the data to the support AP according to the identifier and/or address information of the benefited UE; or after receiving the data, forwarding, by one AP in the related APs, the data to another AP other than the one AP in the related APs, so that the data reaches the support AP after one or more times of forwarding between the related APs.

With reference to the first possible implementation manner in the third aspect of the present invention, in a second possible implementation manner, the method further includes:

storing, by the related APs, a correspondence table of an address of the support AP and the identifier and/or address information of the benefited UE; and the receiving, by the related APs, data sent by the eNB, and directly forwarding the data to the support AP according to the identifier and/or address information of the benefited UE, includes:

receiving, by the related APs, the data sent by the eNB, searching for address information of the support AP in the correspondence table of the address of the support AP and the identifier and/or address information of the benefited UE according to the identifier and/or address information of the benefited UE; and directly forwarding, by the related APs, the data to the support AP according to the address information of the support AP.

With reference to the third aspect of the present invention and the first and second possible implementation manners in the third aspect, in a third possible implementation manner, the method further includes:

receiving, by the related APs, a message that contains information for deleting the identifier and/or address information of the benefited UE and is sent by the eNB; and deleting, by the related APs, the identifier and/or address information of the benefited UE according to the message containing the information for deleting the identifier and/or address information of the benefited UE.

A fourth aspect of the present invention provides a multiple users cooperative communication method, including:

sending, by an evolved NodeB eNB, a message at least containing cooperative layer configuration information and cooperative bearer configuration information of a current support AP to the current support access point AP of a benefited UE, so that the current support AP configures its own cooperative layer and cooperative bearer according to the cooperative layer configuration information and cooperative bearer configuration information;

sending, by the eNB, a message containing cooperative layer configuration information of the benefited UE to the benefited UE, so that the benefited UE configures its own cooperative layer according to the cooperative layer configuration information of the benefited UE; and delivering, by the eNB, data that carries forwarding path indication information to current related APs, so that the current related APs forward the data to the current support AP according to the forwarding path indication information and the current support AP sends the data to the benefited UE, where the current related APs refer to at least one AP that performs multiple users cooperative communication with the current support AP.

In a first possible implementation manner, the method further includes:

detecting, by the eNB, whether the benefited UE moves to a new support AP, if yes:

sending, by the eNB, a message at least containing cooperative layer configuration information and cooperative bearer configuration information of the new support AP to the new support AP, so that the new support AP configures its own cooperative layer and cooperative bearer according to the cooperative layer configuration information and cooperative bearer configuration information;

sending, by the eNB, a message containing cooperative layer update information of the benefited UE to the benefited UE, so that the benefited UE updates its own cooperative layer according to the message of the cooperative layer update information of the benefited UE; and delivering, by the eNB, the data that carries the forwarding path indication information to new related APs, so that the new related APs forward the data to the new support AP according to the forwarding path indication information and the new support AP sends the data to the benefited UE, where the new related APs refer to at least one AP that performs multiple users cooperative communication with the new support AP.

With reference to the first possible implementation manner in the fourth aspect of the present invention, in a second possible implementation manner, the method further includes:

sending, by the eNB, a message containing cooperative layer and cooperative bearer delete information of the current support AP to the current support AP, so that the current support AP deletes its own cooperative layer and cooperative bearer configurations.

A fifth aspect of the present invention provides a multiple users cooperative communication method, including:

receiving, by a support access point AP, a message that at least contains cooperative layer configuration information and cooperative bearer configuration information of the support AP and is sent by an evolved NodeB eNB;

configuring, by the support AP, its own cooperative layer and cooperative bearer according to the cooperative layer configuration information and cooperative bearer configuration information of the support AP; and receiving, by the support AP, data forwarded by related APs, and sending the data to a benefited UE, where the related APs refer to at least one AP that performs multiple users cooperative communication with the support AP.

In a first possible implementation manner, the method further includes:

receiving, by the support AP, a message that contains cooperative layer and cooperative bearer delete information of the support AP and is sent by the eNB; and deleting, by the support AP, the configured cooperative layer and cooperative bearer according to the cooperative layer and cooperative bearer delete information of the support AP.

A sixth aspect of the present invention provides a multiple users cooperative communication method, including:

receiving, by related access points APs, data that carries forwarding path indication information and is sent by an evolved NodeB eNB, where the related APs refer to at least one AP that performs multiple users cooperative communication with a support AP of a benefited UE; and forwarding, by the related APs, the data to the support AP of the benefited UE according to the forwarding path indication information, so that the support AP sends the data to the benefited UE.

In a first possible implementation manner, the forwarding, by the related APs, the data to the support AP of the benefited UE according to the forwarding path indication information, includes:

directly forwarding, by any AP receiving the data in the related APs, the data to the support AP according to the forwarding path indication information; or after receiving the data, forwarding, by one AP in the related APs, the data to another AP other than the one AP in the related APs, so that the data reaches the support AP after one or more times of forwarding between the related APs.

A seventh aspect of the present invention provides an evolved NodeB device, including:

a message sending module, configured to send a message at least containing cooperative layer configuration information and cooperative bearer configuration information of a current support AP to the current support access point AP of a benefited UE, so that the current support AP configures its own cooperative layer and cooperative bearer according to the cooperative layer configuration information and cooperative bearer configuration information of the current support AP, where the message sending module is configured to send identifier and/or address information of the benefited UE to current related APs, where the current related APs refer to at least one AP that performs multiple users cooperative communication with the current support AP; and the message sending module is configured to send a message containing cooperative layer configuration information of the benefited UE to the benefited UE, so that the benefited UE configures its own cooperative layer according to the cooperative layer configuration information of the benefited UE; and a data sending module, configured to deliver data to the current related APs, so that the current related APs forward the data to the current support AP according to the identifier and/or address information of the benefited UE sent by the message sending module, and the current support AP sends the data to the benefited UE.

In a first possible implementation manner, the device further includes:

a detection module, configured to detect whether the benefited UE moves to a new support AP, where the message sending module is further configured to send a message at least containing cooperative layer configuration information and cooperative bearer configuration information of the new support AP to the new support AP after the detection module detects that the benefited UE moves to the new support AP, so that the new support AP configures its own cooperative layer and cooperative bearer according to the cooperative layer configuration information and cooperative bearer configuration information of the new support AP;

the message sending module is further configured to send the identifier and/or address information of the benefited UE to new related APs, where the new related APs refer to at least one AP that performs multiple users cooperative communication with the new support AP;

the message sending module is further configured to send a message containing cooperative layer update information of the benefited UE to the benefited UE, so that the benefited UE updates its own cooperative layer according to the message of the cooperative layer update information of the benefited UE; and the data sending module is further configured to deliver data to the new related APs, so that the new related APs forward the data to the new support AP according to the identifier and/or address information of the benefited UE, and the new support AP sends the data to the benefited UE.

With reference to the first possible implementation manner in the seventh aspect of the present invention, in a second possible implementation manner, the message sending module is further configured to send a message containing cooperative layer and cooperative bearer delete information of the current support AP to the current support AP, so that the current support AP deletes its own cooperative layer and cooperative bearer configurations; and the message sending module is further configured to send a message containing information for deleting the identifier and/or address information of the benefited UE to the current related APs, so that the current related APs delete the identifier and/or address information of the benefited UE.

With reference to the second possible implementation manner in the seventh aspect of the present invention, in a third possible implementation manner, the device further includes:

a confirmation module, configured to confirm whether the new related APs are the same as the current related APs, where the message sending module is specifically configured to send the message containing the information for deleting the identifier and/or address information of the benefited UE to a part of APs that are in the current related APs and different from the new related APs when the confirmation module confirms that the new related APs are the same as a part of APs in the current related APs, so that the part of APs that are in the current related APs and different from the new related APs delete the identifier and/or address information of the benefited UE; or specifically configured to send the message containing the information for deleting the identifier and/or address information of the benefited UE to each AP in the current related APs when the confirmation module confirms that the new related APs are totally different from the current related APs, so that each AP in the current related APs deletes the identifier and/or address information of the benefited UE.

An eighth aspect of the present invention provides an evolved NodeB device, including a processor and a sender, where:

the sender is configured to send a message at least containing cooperative layer configuration information and cooperative bearer configuration information of a current support AP to the current support access point AP of a benefited UE, so that the current support AP configures its own cooperative layer and cooperative bearer according to the cooperative layer configuration information and cooperative bearer configuration information of the current support AP;

the sender is configured to send identifier and/or address information of the benefited UE to current related APs, where the current related APs refer to at least one AP that performs multiple users cooperative communication with the current support AP;

the sender is configured to send a message containing cooperative layer configuration information of the benefited UE to the benefited UE, so that the benefited UE configures its own cooperative layer according to the cooperative layer configuration information of the benefited UE; and the processor is configured to deliver data to the current related APs, so that the current related APs forward the data to the current support AP according to the identifier and/or address information of the benefited UE sent by the sender, and the current support AP sends the data to the benefited UE.

In a first possible implementation manner, the processor is further configured to detect whether the benefited UE moves to a new support AP;

the sender is configured to send a message at least containing cooperative layer configuration information and cooperative bearer configuration information of the new support AP to the new support AP after the detection module detects that the benefited UE moves to the new support AP, so that the new support AP configures its own cooperative layer and cooperative bearer according to the cooperative layer configuration information and cooperative bearer configuration information of the new support AP;

the sender is further configured to send the identifier and/or address information of the benefited UE to new related APs, where the new related APs refer to at least one AP that performs multiple users cooperative communication with the new support AP;

the sender is further configured to send a message containing cooperative layer update information of the benefited UE to the benefited UE, so that the benefited UE updates its own cooperative layer according to the message of the cooperative layer update information of the benefited UE; and the processor is further configured to deliver data to the new related APs, so that the new related APs forward the data to the new support AP according to the identifier and/or address information of the benefited UE, and the new support AP sends the data to the benefited UE.

With reference to the first possible implementation manner in the eighth aspect of the present invention, in a second possible implementation manner, the sender is further configured to:

send a message containing cooperative layer and cooperative bearer delete information of the current support AP to the current support AP, so that the current support AP deletes its own cooperative layer and cooperative bearer configurations; and send a message containing information for deleting the identifier and/or address information of the benefited UE to the current related APs, so that the current related APs delete the identifier and/or address information of the benefited UE.

With reference to the second possible implementation manner in the eighth aspect of the present invention, in a third possible implementation manner, the processor is further configured to confirm whether the new related APs are the same as the current related APs; and the sender is further specifically configured to send the message containing the information for deleting the identifier and/or address information of the benefited UE to a part of APs that are in the current related APs and different from the new related APs when the processor confirms that the new related APs are the same as a part of APs in the current related APs, so that the part of APs that are in the current related APs and different from the new related APs delete the identifier and/or address information of the benefited UE;

or specifically configured to send the message containing the information for deleting the identifier and/or address information of the benefited UE to each AP in the current related APs when the processor confirms that the new related APs are totally different from the current related APs, so that each AP in the current related APs deletes the identifier and/or address information of the benefited UE.

A ninth aspect of the present invention provides an access point device, where the access point device is used as a support access point AP of a benefited UE, the access point device including:

a receiving module, configured to receive a message that at least contains cooperative layer configuration information and cooperative bearer configuration information of the access point device and is sent by an evolved NodeB eNB;

a configuration module, configured to configure a cooperative layer and cooperative bearer of the access point device according to the cooperative layer configuration information and cooperative bearer configuration information of the access point device received by the receiving module, where the receiving module is configured to receive data forwarded by related APs, where the related APs refer to at least one AP that performs multiple users cooperative communication with the access point device; and a sending module, configured to send the data received by the receiving module to the benefited UE.

In a first possible implementation manner, the receiving module is further configured to receive a message that contains cooperative layer and cooperative bearer delete information of the access point and is sent by the eNB; and the device further includes:

a configuration deletion module, configured to delete the configured cooperative layer and cooperative bearer according to the cooperative layer and cooperative bearer delete information of the access point received by the receiving module.

A tenth aspect of the present invention provides an access point device, including a receiver, a sender, and a processor, where:

the receiver is configured to receive a message that at least contains cooperative layer configuration information and cooperative bearer configuration information of the access point device and is sent by an evolved NodeB eNB;

the processor is configured to configure a cooperative layer and cooperative bearer of the access point device according to the cooperative layer configuration information and cooperative bearer configuration information of the access point device received by the receiver;

the receiver is configured to receive data forwarded by related APs, where the related APs refer to at least one AP that performs multiple users cooperative communication with the access point device; and the sender is configured to send the data received by the receiver to a benefited UE.

In a first possible implementation manner, the receiver is further configured to receive a message that contains cooperative layer and cooperative bearer delete information of the access point device and is sent by the eNB; and the processor is further configured to delete the configured cooperative layer and cooperative bearer according to the cooperative layer and cooperative bearer delete information of the access point device received by the receiver.

An eleventh aspect of the present invention provides an access point device, where the access point device is used as an AP that performs multiple users cooperative communication with a support access point AP of a benefited UE, the access point device including:

a receiving module, configured to receive identifier and/or address information of the benefited UE sent by an evolved NodeB eNB, where the receiving module is configured to receive data sent by the eNB; and a forwarding module, configured to send the data received by the receiving module to the support AP according to the identifier and/or address information of the benefited UE received by the receiving module, so that the support AP sends the data to the benefited UE.

In a first possible implementation manner, the forwarding module is specifically configured to:

directly forward the data to the support AP according to the identifier and/or address information of the benefited UE; or forward the data to another access point device that performs multiple users cooperative communication with the support AP, so that the data reaches the support AP after one or more times of forwarding between access point devices.

With reference to the first possible implementation manner in the eleventh aspect, in a second possible implementation manner, the device further includes:

a storage module, configured to store a correspondence table of an address of the support AP and the identifier and/or address information of the benefited UE, where the forwarding module is specifically configured to acquire the correspondence table of the address of the support AP and the identifier and/or address information of the benefited UE from the storage module, search for address information of the support AP in the correspondence table of the address of the support AP and the identifier and/or address information of the benefited UE, and directly forward the data to the support AP according to the address information of the support AP.

With reference to the eleventh aspect and the first and second possible implementation manners in the eleventh aspect of the present invention, in a third possible implementation manner, the receiving module is further configured to receive a message that contains information for deleting the identifier and/or address information of the benefited UE and is sent by the eNB; and the device further includes:

a deletion module, configured to delete the identifier and/or address information of the benefited UE according to the message that is for deleting the identifier and/or address information of the benefited UE and is received by the receiving module.

A twelfth aspect of the present invention provides an access point device, including a receiver and a processor, where:

the receiver is configured to receive identifier and/or address information of a benefited UE sent by an evolved NodeB eNB;

the receiver is configured to receive data sent by the eNB; and the processor is configured to forward the data to the support AP according to the identifier and/or address information of the benefited UE received by the receiver, so that the support AP sends data to the benefited UE.

In a first possible implementation manner, the processor is specifically configured to:

directly forward the data to the support AP according to the identifier and/or address information of the benefited UE received by the receiver; or forward the data to another access point device that performs multiple users cooperative communication with the support AP, so that the data reaches the support AP after one or more times of forwarding between access point devices.

With reference to the first possible implementation manner in the twelfth aspect, in a second possible implementation manner, the device further includes:

a memory, configured to store a correspondence table of an address of the support AP and the identifier and/or address information of the benefited UE, where the processor is specifically configured to receive data sent by the eNB, search for address information of the support AP in the correspondence table of the address of the support AP and the identifier and/or address information of the benefited UE according to the identifier and/or address information of the benefited UE received by the receiver, and directly forward the data to the support AP according to the address information of the support AP.

With the reference to the twelfth aspect and the first and second possible implementation manners in the twelfth aspect of the present invention, in a third possible implementation manner, the receiver is further configured to receive a message that contains information for deleting the identifier and/or address information of the benefited UE and is sent by the eNB; and the processor is further configured to delete the identifier and/or address information of the benefited UE according to the message that is for deleting the identifier and/or address information of the benefited UE and is received by the receiver.

A thirteenth aspect of the present invention provides an evolved NodeB device, including:

a message sending module, configured to send a message at least containing cooperative layer configuration information and cooperative bearer configuration information of a current support AP to the current support access point AP of a benefited UE, so that the current support AP configures its own cooperative layer and cooperative bearer according to the cooperative layer configuration information and cooperative bearer configuration information of the current support AP, where the message sending module is configured to send a message containing cooperative layer configuration information of the benefited UE to the benefited UE, so as to configure a cooperative layer of the benefited UE; and a data sending module, configured to deliver data that carries forwarding path indication information to current related APs, so that the current related APs forward the data to the current support AP according to the forwarding path indication information sent by the message sending module, and the current support AP sends the data to the benefited UE, where the current related APs refer to at least one AP that performs multiple users cooperative communication with the current support AP.

In a first possible implementation manner, the device further includes:

a detection module, configured to detect whether the benefited UE moves to a new support AP, where the message sending module is further configured to send a message at least containing cooperative layer configuration information and cooperative bearer configuration information of the new support AP to the new support AP after the detection module detects that the benefited UE moves to the new support AP, so that the new support AP configures its own cooperative layer and cooperative bearer according to the cooperative layer configuration information and cooperative bearer configuration information of the new support AP;

the message sending module is further configured to send a message containing cooperative layer update information of the benefited UE to the benefited UE after the detection module detects that the benefited UE moves to the new support AP, so as to update the cooperative layer of the benefited UE; and the data sending module is further configured to deliver the data that carries the forwarding path indication information to new related APs after the detection module detects that the benefited UE moves to the new support AP, so that the new related APs forward the data to the new support AP according to the forwarding path indication information and the new support AP sends the data to the benefited UE, where the new related APs refer to at least one AP that performs multiple users cooperative communication with the new support AP.

With reference to the first possible implementation manner in the thirteenth aspect, in a second possible implementation manner, the message sending module is further configured to send a message containing cooperative layer and cooperative bearer delete information of the current support AP after the detection module detects that the benefited UE moves to the new support AP, so that the current support AP deletes its own cooperative layer and cooperative bearer configurations.

A fourteenth aspect of the present invention provides an evolved NodeB device, including a processor and a sender, where:

the sender is configured to send a message at least containing cooperative layer configuration information and cooperative bearer configuration information of a current support access point AP to the current support access point AP of a benefited UE, so that the current support AP configures its own cooperative layer and cooperative bearer according to the cooperative layer configuration information and cooperative bearer configuration information of the current support AP;

the sender is configured to send a message containing cooperative layer configuration information of the benefited UE to the benefited UE, so that the benefited UE configures its own cooperative layer according to the cooperative layer configuration information of the benefited UE; and the processor is configured to deliver data that carries forwarding path indication information to current related APs, so that the current related APs forward the data to the current support AP according to the forwarding path indication information sent by the sender, and the current support AP sends the data to the benefited UE, where the current related APs refer to at least one AP that performs multiple users cooperative communication with the current support AP.

In a first possible implementation manner,
the processor is further configured to detect whether the benefited UE moves to a new support AP;
the sender is configured to send a message at least containing cooperative layer configuration information and cooperative bearer configuration information of the new support AP to the new support AP after the processor detects that the benefited UE moves to the new support AP, so that the new support AP configures its own cooperative layer and cooperative bearer according to the cooperative layer configuration information and cooperative bearer configuration information of the new support AP;
the sender is further configured to send a message containing cooperative layer update information of the benefited UE to the benefited UE, so that the benefited UE updates its own cooperative layer according to the message of the cooperative layer update information of the benefited UE; and
the processor is further configured to deliver the data that carries the forwarding path indication information to new related APs, so that the new related APs forward the data to the new support AP through the multiple users cooperative communication according to the forwarding path indication information, and the new support AP sends the data to the benefited UE, where the new related APs refer to at least one AP that performs multiple users cooperative communication with the new support AP.

With reference to the first possible implementation manner in the fourteenth aspect, in a second possible implementation manner, the sender is further configured to:
send a message containing cooperative layer and cooperative bearer delete information of the current support AP to the current support AP, so that the current support AP deletes its own cooperative layer and cooperative bearer configurations.

A fifteenth aspect of the present invention provides an access point device, where the access point device is used as a support access point AP of a benefited UE, the access point device including:
a receiving module, configured to receive a message that at least contains cooperative layer configuration information and cooperative bearer configuration information of the access point device and is sent by an evolved NodeB eNB;
a configuration module, configured to configure a cooperative layer and cooperative bearer of the access point device according to the cooperative layer configuration information and cooperative bearer configuration information of the access point device received by the receiving module, where
the receiving module is configured to receive data forwarded by related access points APs, where the related APs refer to at least one AP that performs multiple users cooperative communication with the access point device; and
a sending module, configured to send the data received by the receiving module to the benefited UE.

In a first possible implementation manner, the receiving module is further configured to receive a message that contains cooperative layer and cooperative bearer delete information of the access point device and is sent by the eNB; and
the device further includes:
a configuration deletion module, configured to delete the configured cooperative layer and cooperative bearer according to the cooperative layer and cooperative bearer delete information of the access point device received by the receiving module.

A sixteenth aspect of the present invention provides an access point device, including a receiver, a sender, and a processor, where:
the receiver is configured to receive a message that at least contains cooperative layer configuration information and cooperative bearer configuration information of the access point device and is sent by an evolved NodeB eNB;
the processor is configured to configure a cooperative layer and cooperative bearer according to the cooperative layer configuration information and cooperative bearer configuration information of the access point device received by the receiver;
the receiver is configured to receive data forwarded by related APs, where the related APs refer to at least one AP that perform is multiple users cooperative communication with the access point device; and
the sender is configured to send the data received by the receiver to a benefited UE.

In a first possible implementation manner,
the receiver is further configured to receive a message that contains cooperative layer and cooperative bearer delete information of the access point device and is sent by the eNB; and
the processor is further configured to delete the configured cooperative layer and cooperative bearer according to the cooperative layer and cooperative bearer delete information of the access point device received by the receiver.

A seventeenth aspect of the present invention provides an access point device, where the access point device is used as an AP that performs multiple users cooperative communication with a support access point AP of a benefited UE, the access point device including:
a receiving module, configured to receive data that carries forwarding path indication information and is sent by an evolved NodeB eNB; and
a forwarding module, configured to forward the data to the support AP according to the forwarding path indication information contained in the data received by the receiving module, so that the support AP sends the data to the benefited UE.

In a first possible implementation manner, the forwarding module is specifically configured to:
directly forward the data to the support AP according to the forwarding path indication information; or
forward the data to another access point device that performs multiple users cooperative communication with the support AP, so that the data reaches the support AP after one or more times of forwarding between access point devices.

An eighteenth aspect of the present invention provides an access point device, including a receiver and a processor, where:
the receiver is configured to receive data that carries forwarding path indication information and is sent by an evolved NodeB eNB; and
the processor is configured to forward the data to a support AP of the benefited UE according to the forwarding path indication information contained in the data received by the receiving module, so that the support AP sends the data to the benefited UE.

In a first possible implementation manner, the processor is specifically configured to:

directly forward the data to the support AP according to the forwarding path indication information received by the receiver; or forward the data to another access point device that performs multiple users cooperative communication with the support AP, so that the data reaches the support AP after one or more times of forwarding between access point devices.

A nineteenth aspect of the present invention provides a multiple users cooperative communication system, including an evolved NodeB device according to the seventh aspect or its possible implementation manners, an access point device according to the ninth aspect or its possible implementation manners, and an access point device according to the eleventh aspect or its possible implementation manners, where the access point device according to the eleventh aspect or its possible implementation manners refers to at least one AP that performs multiple users cooperative communication with the access point device according to the ninth aspect or its possible implementation manners.

A twentieth aspect of the present invention provides a multiple users cooperative communication system, including an evolved NodeB device according to the eighth aspect or its possible implementation manners, an access point device according to the tenth aspect or its possible implementation manners, and an access point device according to the twelfth aspect or its possible implementation manners, where the access point device according to the twelfth aspect or its possible implementation manners refers to at least one AP that performs multiple users cooperative communication with the access point device according to the tenth aspect or its possible implementation manners.

A twenty-first aspect of the present invention provides a multiple users cooperative communication system, including an evolved NodeB device according to the thirteenth aspect or its possible implementation manners, an access point device according to the fifteenth aspect or its possible implementation manners, and an access point device according to the seventeenth aspect or its possible implementation manners, where the access point device according to the seventeenth aspect or its possible implementation manners refers to at least one AP that perform is multiple users cooperative communication with the access point device according to the fifteenth aspect or its possible implementation manners.

A twenty-second aspect of the present invention provides a multiple users cooperative communication system, including an evolved NodeB device according to the fourteenth aspect or its possible implementation manners, an access point device according to the sixteenth aspect or its possible implementation manners, and an access point device according to the eighteenth aspect or its possible implementation manners, where the access point device according to the eighteenth aspect or its possible implementation manners refers to at least one AP that performs multiple users cooperative communication with the access point device according to the sixteenth aspect or its possible implementation manners.

In the present invention, through multiple users cooperative communication between access points (AP), data to be sent to a UE by an eNB may be sent to a support AP at first, and then sent to the UE by the support AP. When the support AP is in a poor network environment, the eNB may send the data to another AP near the support AP, and then the data is forwarded to the support AP by the another AP. In this way, the eNB may select an AP having the best channel from several APs and then deliver the data to the AP, thereby achieving an effect of multiuser diversity. The problems of increased power consumption and complexity resulted from MUCC are transferred to APs, and a majority of UEs are released, so that the UE has a simple structure, low power consumption, and improved reliability of communication.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The present invention provides a multiple users cooperative communication method and a related device and system. The multiple users cooperative communication method and the related device and system, having multiuser diversity gain and high reliability of communication without increasing complexity and power consumption of a UE, are described in details in the following.

Figure 1:
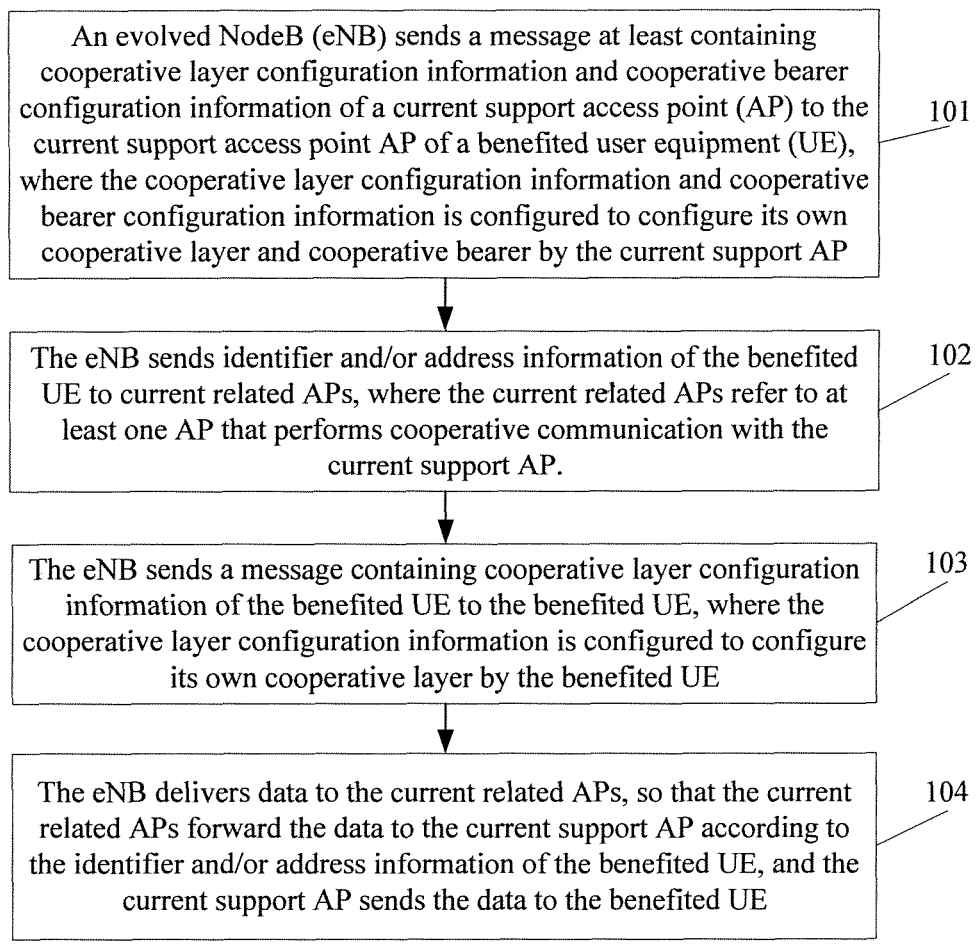
FIG. 1 is a flow chart of a multiple users cooperative communication method according to an embodiment of the present invention.

Referring to FIG. 1, FIG. 1 is a flow chart of a multiple users cooperative communication method according to an embodiment of the present invention, including:

101: An evolved NodeB (eNB) sends a message at least containing cooperative layer configuration information and cooperative bearer configuration information of a current support access point (AP) to the current support access point AP of a benefited user equipment (UE), where the cooperative layer configuration information and cooperative bearer configuration information is used for configure its own cooperative layer and cooperative bearer by the current support AP.

An AP specifically may be a support UE in MUCC Form 2, a UE with a good channel condition selected by the eNB, a fixedly-arranged super E5 (the super E5 may be a special terminal particularly for supporting another UE, and may also be a common terminal), or a small-size relay, or the like. The process, during which the eNB sends a message at least containing cooperative layer configuration information and cooperative bearer configuration information of the current support AP to the current support access point AP of the benefited UE, so that the current support AP configures its own cooperative layer and cooperative bearer according to the cooperative layer configuration information and cooperative bearer configuration information of the current support AP, is the same as that in the existing MUCC technology, and will not be repeated herein.

The benefited UE is described with respect to data. When the eNB is to send data to a target UE, the target UE is the benefited UE. The support AP is described with respect to the benefited UE. The AP providing support for the benefited UE is the support AP of the benefited UE. Meanwhile, with respect to other UEs, this AP may be one of related APs in cooperation with support APs of other UEs; and the support AP may support a plurality of UEs simultaneously, that is, the support AP may be a support AP of several benefited UEs.

102: The eNB sends identifier and/or address information of the benefited UE to a current related AP, where the current related AP refers to at least one AP that performs multiple users cooperative communication with the current support AP.

The term "and/or" in this document just refers to a correlation of the associated objects, and represents that three relationships may exist. For example, A and/or B may represent the following three cases: only A exists, both A and B exist, and only B exists.

The related APs are APs that perform multiple users cooperative communication with the support AP.

103: The eNB sends a message containing cooperative layer configuration information of the benefited UE to the benefited UE, where the cooperative layer configuration information is configured to configure its own cooperative layer by the benefited UE.

The configuration content and configuration method for configuring a cooperative layer and cooperative bearer of the benefited UE by the eNB are the same as those in the existing MUCC technology, and will not be repeated herein.

104: The eNB delivers data to the current related AP, so that the current related AP forward the data to the current support AP according to the identifier and/or address information of the benefited UE, and the current support AP sends the data to the benefited UE.

When the eNB does not directly send data to be sent to the benefited UE to the support AP due to the poor network environment of the support AP or other reasons, the evolved NodeB device may send data to an AP in the related APs. This AP receives data and forwards the data to the support AP according to the identifier and/or address information of the benefited UE, or forwards the data to another AP in the related APs, so that the data is finally forwarded to the support AP after one or more times of forwarding between the related APs, and the support AP further sends the data to the benefited UE.

In this embodiment, through multiple users cooperative communication between APs, data to be sent to a UE by an eNB may be sent to a support AP at first, and then sent to the UE by the support AP. When the support AP is in a poor network environment, the eNB may send the data to another AP near the support AP, and then the data is forwarded to the support AP by the another AP. In this way, the eNB may select an AP having the best channel from several APs and then deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 2:
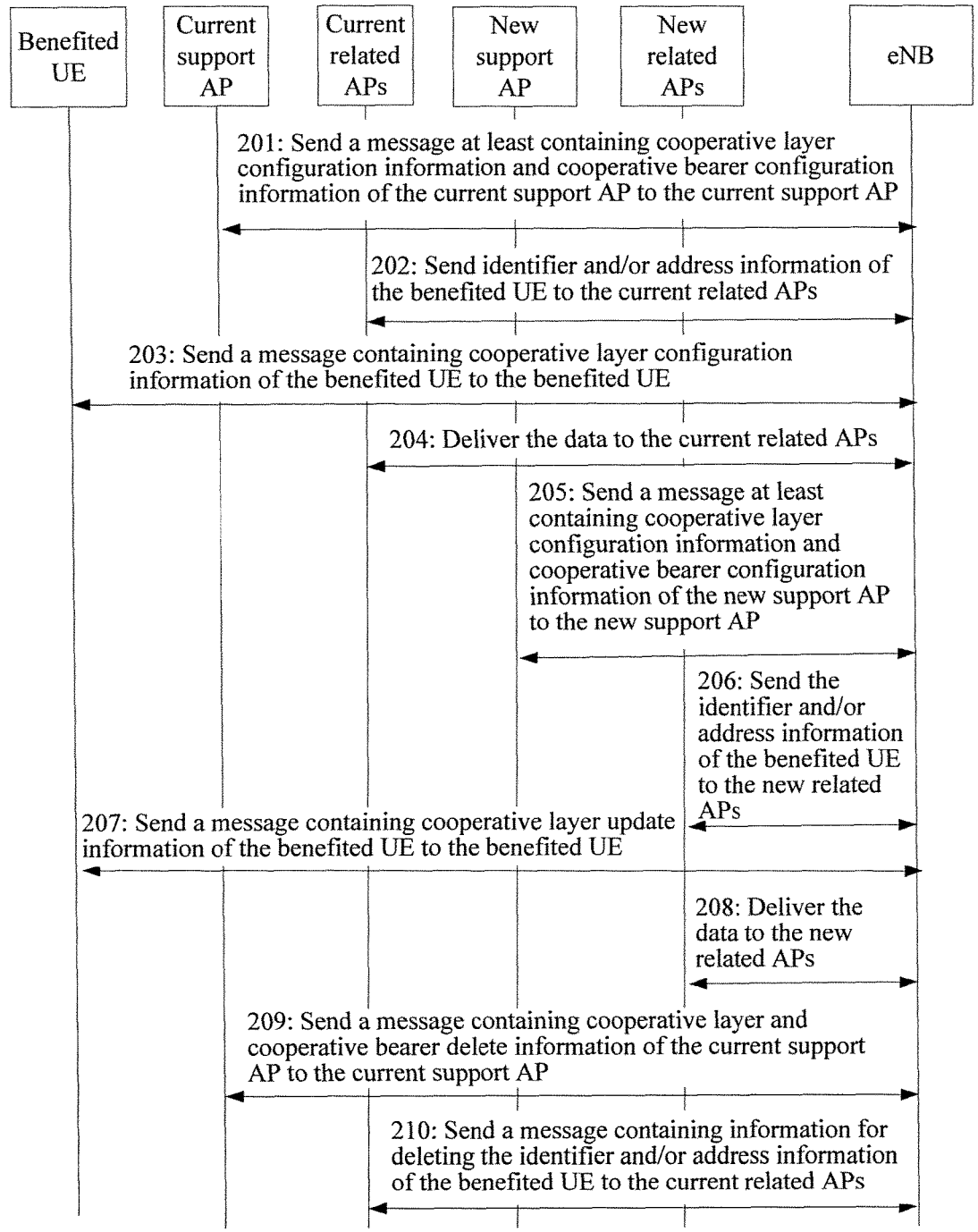
FIG. 2 is a flow chart of another multiple users cooperative communication method according to an embodiment of the present invention.

Referring to FIG. 2, FIG. 2 is a flow chart of a multiple users cooperative communication method according to another embodiment of the present invention, including.

201: An eNB sends a message at least containing cooperative layer configuration information and cooperative bearer configuration information of a current support AP to the current support AP.

The eNB sends the message at least containing the cooperative layer configuration information and cooperative bearer configuration information of the current support AP to the current support AP of a benefited UE, so that the current support AP configures its own cooperative layer and cooperative bearer according to the cooperative layer configuration information and cooperative bearer configuration information of the current support AP.

202: The eNB sends the identifier and/or address information of the benefited UE to the current related APs. Herein, the current related APs refer to at least one AP that performs multiple users cooperative communication with the current support AP.

203: The eNB sends a message containing cooperative layer configuration information of the benefited UE to the benefited UE The eNB sends the message containing the cooperative layer configuration information of the benefited UE to the benefited UE, so that the benefited UE configures its own cooperative layer according to the cooperative layer configuration information of the benefited UE.

204: The eNB delivers data to the current related APs.

The eNB delivers the data to the current related APs, so that the current related APs forward the data to the current support AP according to the identifier and/or address information of the benefited UE, and the current support AP sends the data to the benefited UE.

When the benefited UE moves, the AP providing support for the benefited UE is likely to change. When the eNB detects that the benefited UE moves, and selects a new support AP for the benefited UE, the eNB also executes the following step 205 to step 210:

205: The eNB sends a message at least containing cooperative layer configuration information and cooperative bearer configuration information of the new support AP to the new support AP.

The eNB sends a message at least containing cooperative layer configuration information and cooperative bearer configuration information of the new support AP to the new support AP, so that the new support AP configures its own cooperative layer and cooperative bearer according to the cooperative layer configuration information and cooperative bearer configuration information of the new support AP.

The new support AP may be reselected by the eNB according to the channel condition or subscription information. This embodiment uses a new support AP as an example for description, the new support AP may also be at least one AP in the related APs, which is not limited in the present invention.

When the benefited UE moves, the AP providing support for the benefited UE is likely to change. When the support AP of the benefited UE changes, the eNB will perform an update procedure of the cooperative relationship, and configure a cooperative layer and cooperative bearer for the new support AP, where the configuration content and configuration method are the same as those of the support AP before movement, and will not be repeated herein.

206: The eNB sends identifier and/or address information of the benefited UE to new related APs.

The new related APs refer to at least one AP that performs multiple users cooperative communication with the new support AP.

After the support AP changes, the related APs that perform multiple users cooperative communication with the new support AP will also change. When there are multiple current related AP, the new related APs may have a same part of APs as the current related APs before the benefited UE moves, and may also be different from all APs.

207: The eNB sends a message containing cooperative layer update information of the benefited UE to the benefited UE The eNB sends the message containing the cooperative layer update information of the benefited UE to the benefited UE, so that the benefited UE updates its own cooperative layer according to the message of the cooperative layer update information of the benefited UE.

208: The eNB delivers data to new related APs.

The eNB delivers the data to the new related APs, so that the new related APs forward the data to the new support AP according to the identifier and/or address information of the benefited UE, and then the new support AP sends the data to the benefited UE.

209: The eNB sends a message containing cooperative layer and cooperative bearer delete information of the current support AP to the current support AP.

The eNB sends a message containing cooperative layer and cooperative bearer delete information of the current support AP to the current support AP, so that the current support AP deletes its own cooperative layer and cooperative bearer configurations.

After the benefited UE moves, the original current support AP providing support for the benefited UE will not perform data communication with the benefited UE anymore, and the cooperative layer and cooperative bearer of the current support AP are deleted, and therefore the information maintenance amount of the current support AP can be reduced and the efficiency of the benefited UE can be improved.

210: The eNB sends a message containing information for deleting the identifier and/or address information of the benefited UE to the current related APs.

The eNB sends a message containing information for deleting the identifier and/or address information of the benefited UE to the current related APs, so that the current related APs delete the identifier and/or address information of the benefited UE.

When number of the current related AP are multiple, if the new related APs have a same part of APs as the current related APs, the eNB sends the message containing the information for deleting the identifier and/or address information of the benefited UE to this part of APs different from the new related APs, so that this part of APs that are in the current related APs and different from the new related APs delete the identifier and/or address information of the benefited UE. If the new related APs are different from each AP in the current related APs, the eNB sends the message containing the information for deleting the identifier and/or address information of the benefited UE to each AP in the current related APs, so that each AP in the current related APs deletes the identifier and/or address information of the benefited UE.

In this embodiment, after the benefited UE moves, the eNB will automatically reselect a new support AP and new related APs for the moved benefited UE, and perform corresponding configurations for the benefited UE, the new support AP, and the new related APs. The multiple users cooperative communication continues to be implemented between the new support AP and the new related APs. The multiple users cooperative communication achieves the effect of multiuser diversity, the problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 3:
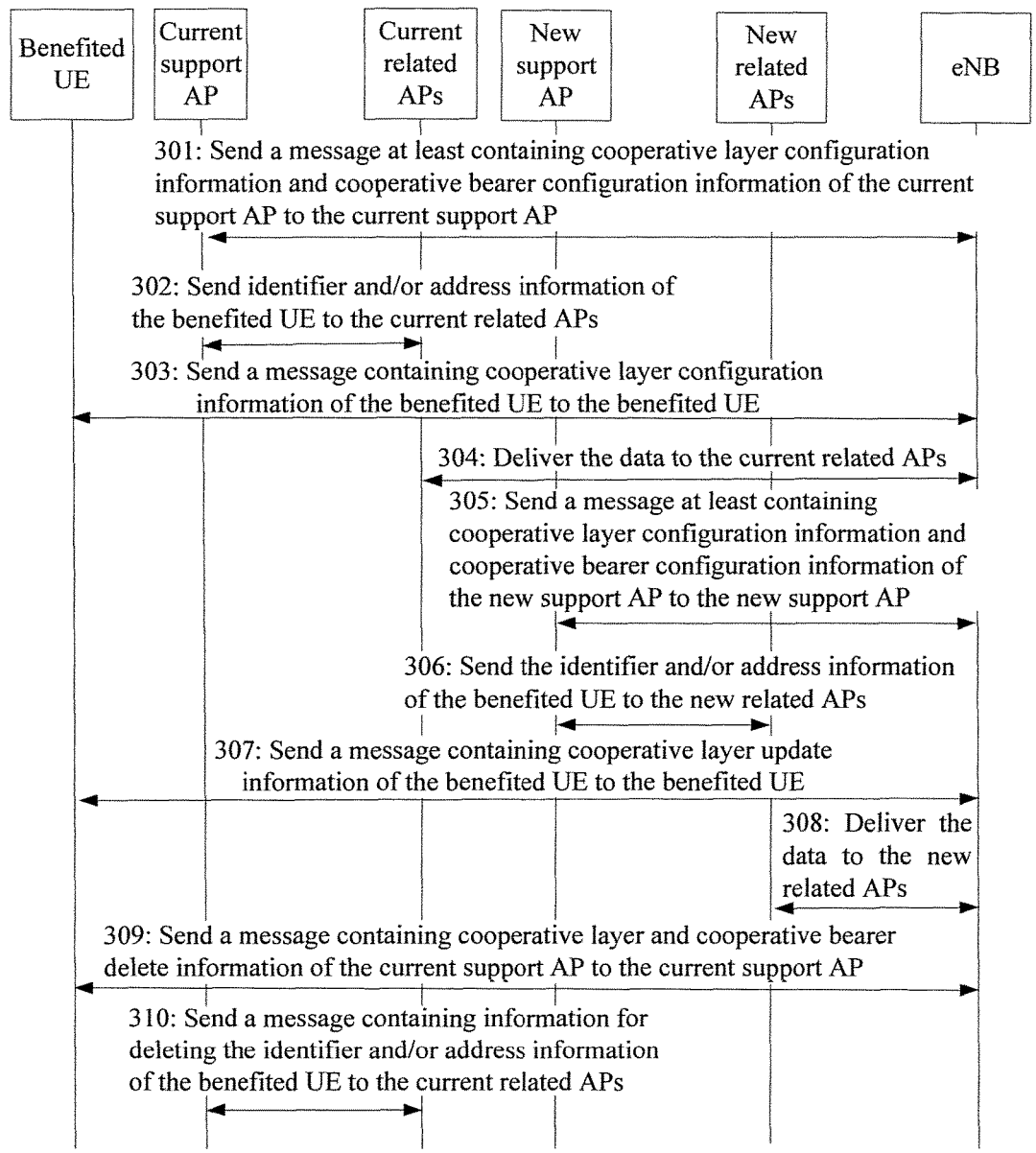
FIG. 3 is a flow chart of another multiple users cooperative communication method according to an embodiment of the present invention.

Referring to FIG. 3, FIG. 3 is a flow chart of another multiple users cooperative communication method according to an embodiment of the present invention, including step 301 to step 310, where, with respect to the embodiment of FIG. 2, for the identifier and/or address information of benefited UE in the related APs, a UE address list may be sent automatically by the support AP through a short distance transfer protocol to the surrounding APs capable of performing MUCC, so as to update such information. The specific steps include:

301: An eNB sends a message at least containing cooperative layer configuration information and cooperative bearer configuration information of a current support AP to the current support AP.

The eNB sends a message at least containing cooperative layer configuration information and cooperative bearer configuration information of a current support AP to the current support AP of a benefited UE, so that the current support AP configures its own cooperative layer and cooperative bearer according to the cooperative layer configuration information and cooperative bearer configuration information of the current support AP.

302: The current support AP sends the identifier and/or address information of the benefited UE to the current related APs. Herein, the current related APs refer to at least one AP that performs multiple users cooperative communication with the current support AP.

303: The eNB sends a message containing cooperative layer configuration information of the benefited UE to the benefited UE.

The eNB sends the message containing the cooperative layer configuration information of the benefited UE to the benefited UE, so that the benefited UE configures its own cooperative layer according to the cooperative layer configuration information of the benefited UE.

304: The eNB delivers data to the current related APs.

The eNB delivers the data to the current related APs, so that the current related APs forward the data to the current support AP according to the identifier and/or address information of the benefited UE, and the current support AP sends the data to the benefited UE.

When the benefited UE moves, the AP providing support for the benefited UE is likely to change. When the eNB detects that the benefited UE moves, and selects a new support AP for the benefited UE, the eNB also executes the following step 305 to step 310:

305: The eNB sends a message at least containing cooperative layer configuration information and cooperative bearer configuration information of the new support AP to the new support AP.

The eNB sends the message at least containing the cooperative layer configuration information and cooperative bearer configuration information of the new support AP to the new support AP, so that the new support AP configures its own cooperative layer and cooperative bearer according to the cooperative layer configuration information and cooperative bearer configuration information of the new support AP.

The new support AP may be reselected by the eNB according to the channel condition or subscription information. This embodiment uses a new support AP as an example for description, the new support AP may also be at least one AP in the related APs, which is not limited in the present invention.

When the benefited UE moves, the AP providing support for the benefited UE is likely to change. When the support AP of the benefited UE changes, the eNB will perform an update procedure of the cooperative relationship, and configure a cooperative layer and cooperative bearer for the new support AP, where the configuration content and configuration method are the same as those of the support AP before movement, and will not be repeated herein.

306: The current support AP sends the identifier and/or address information of the benefited UE to new related APs.

The new related APs refer to at least one AP that performs multiple users cooperative communication with the new support AP.

When number of the current related AP are multiple, after the support AP changes, the related APs that perform multiple users cooperative communication with the new support AP will also change. The new related APs may have a same part of APs as the current related APs before the benefited UE moves, and may also be different from all APs.

307: The eNB sends a message containing cooperative layer update information of the benefited UE to the benefited UE.

The eNB sends the message containing cooperative layer update information of the benefited UE to the benefited UE, so that the benefited UE updates its own cooperative layer according to the message of the cooperative layer update information of the benefited UE.

308: The eNB delivers data to new related APs.

The eNB delivers the data to the new related APs, so that the new related APs forward the data to the new support AP according to the identifier and/or address information of the benefited UE, and then the new support AP sends the data to the benefited UE.

309: The eNB sends a message containing cooperative layer and cooperative bearer delete information of the current support AP to the current support AP.

The eNB sends the message containing the cooperative layer and cooperative bearer delete information of the current support AP to the current support AP, so that the current support AP deletes its own cooperative layer and cooperative bearer configurations.

After the benefited UE moves, the original current support AP providing support for the benefited UE will not perform data communication with the benefited UE anymore, and the cooperative layer and cooperative bearer of the current support AP are deleted, and therefore the information maintenance amount of the current support AP can be reduced and the efficiency thereof can be improved.

310: The new support AP sends a message containing information for deleting the identifier and/or address information of the benefited UE to the current related APs.

The new support AP sends the message containing the information for deleting the identifier and/or address information of the benefited UE to the current related APs, so that the current related APs delete the identifier and/or address information of the benefited UE.

When number of the current related AP are multiple, if the new related APs have a same part of APs as the current related APs, the new support AP sends the message containing the information for deleting the identifier and/or address information of the benefited UE to this part of APs different from the new related APs, so that this part of APs that are in the current related APs and different from the new related APs delete the identifier and/or address information of the benefited UE. If the new related APs are different from each AP in the current related APs, the new support AP sends the message containing the information for deleting the identifier and/or address information of the benefited UE to each AP in the current related APs, so that each AP in the current related APs deletes the identifier and/or address information of the benefited UE.

In this embodiment, after the benefited UE moves, the eNB will automatically reselect a new support AP and new related APs for the moved benefited UE, and perform corresponding configurations for the benefited UE, the new support AP, and the new related APs. The multiple users cooperative communication continues to be implemented between the new support AP and the new related APs. The multiple users cooperative communication achieves the effect of multiuser diversity, the problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 4:
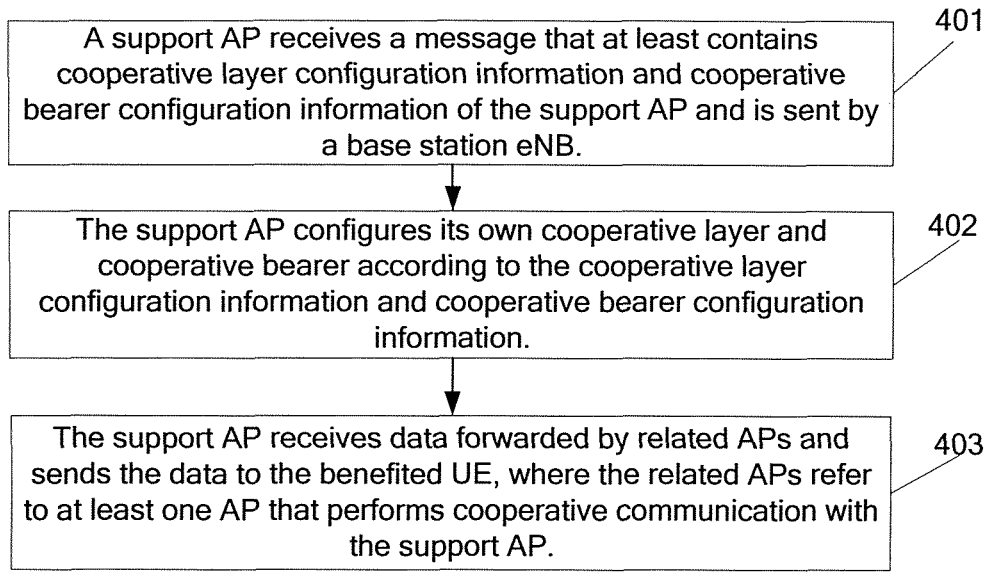
FIG. 4 is a flow chart of a multiple users cooperative communication method according to an embodiment of the present invention.

Referring to FIG. 4, FIG. 4 is a flow chart of a multiple users cooperative communication method according to an embodiment of the present invention. In this embodiment, the technical solution of the present invention is described from a perspective of a support AP. The method includes:

401: A support AP receives a message that at least contains cooperative layer configuration information and cooperative bearer configuration information of the support AP and is sent by an evolved NodeB eNB.

402: The support AP configures its own cooperative layer and cooperative bearer according to the cooperative layer configuration information and cooperative bearer configuration information.

403: The support receives data forwarded by related APs, and sends the data to a benefited UE, where the related APs refer to at least one AP that performs multiple users cooperative communication with the support AP.

If the benefited UE moves, the AP providing support for the benefited UE will change to AP2. When the original support AP does not provide support for the benefited UE any more, the eNB will send a message containing cooperative layer and cooperative bearer delete information of the support AP to the original support AP, so that the original support AP deletes its own cooperative layer and cooperative bearer configurations. In this case, the method further includes: receiving a message that contains cooperative layer and cooperative bearer delete information of the support AP and is sent by the eNB, and deleting the configured cooperative layer and cooperative bearer according to the cooperative layer and cooperative bearer delete information of the support AP.

In this embodiment, when the support AP of the benefited UE is in a poor network environment currently, the eNB may deliver data to be sent to the benefited UE to a related AP having a good channel in the related APs, and then data is forwarded to the support AP by the related APs, and finally sent to the benefited UE by the support AP. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 5:
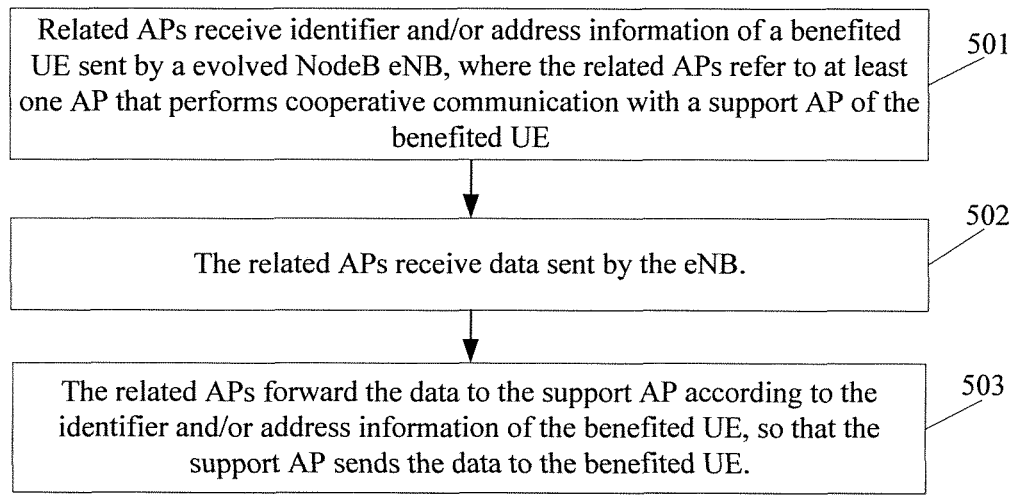
FIG. 5 is a flow chart of a multiple users cooperative communication method according to an embodiment of the present invention.

Referring to FIG. 5, FIG. 5 is a flow chart of a multiple users cooperative communication method according to an embodiment of the present invention. In this embodiment, the present invention is described from a perspective of a support AP. The method includes:

501: Related APs receive identifier and/or address information of a benefited UE sent by an evolved NodeB eNB, where the related APs refer to at least one AP that performs multiple users cooperative communication with a support AP of the benefited UE.

502: The related APs receive data sent by the eNB.

503: The related APs forward the data to the support AP according to the identifier and/or address information of the benefited UE, so that the support AP sends the data to the benefited UE.

The specific process during which the related APs forward the data to the support AP according to the identifier and/or address information of the benefited UE, so that the support AP sends the data to the benefited UE is as follows:

directly forwarding, by any AP receiving the data in the related APs, the data to the support AP according to the identifier and/or address information of the benefited UE; or after receiving the data, forwarding, by one AP in the related APs, the data to another AP other than the one AP in the related APs, so that the data reaches the support AP after one or more times of forwarding between the related APs.

The related APs store a correspondence table of an address of the support AP and the identifier and/or address information of the benefited UE. After receiving data sent by the eNB, the related APs search for address information of the support AP in the correspondence table of the address of the support AP and the identifier and/or address information of the benefited UE according to the identifier and/or address information of the benefited UE, and directly forward the data to the support AP according to the address information of the support AP.

Through the multiple users cooperative communication between the APs in this embodiment, data transmission between the eNB and the benefited UE is likely to have more than one times of forwarding. Therefore, solving the multihop forwarding of data between the APs that perform multiple users cooperative communication with each other becomes a key technology. One possible implementation manner of the multihop forwarding of data may be as follows:

After the first AP receiving data in the related APs receives the data, a support AP of the benefited UE is searched for in the correspondence table of the address of the support AP and the identifier and/or address information of the benefited UE, and the data is forwarded to the support AP by using the short distance transfer protocol; or after the first AP receiving data in the related APs receives the data, the data is forwarded to another AP in the related APs by using the short distance transfer protocol, so that the data is finally forwarded to the support AP after one or more times of forwarding between the related APs, where the AP forwarding the data to the support AP in the related APs searches for the support AP of the benefited UE in the correspondence table of the address of the support AP and the identifier and/or address information of the benefited UE, and then forwards the data to the support AP by using the short distance transfer protocol.

Figure 6:
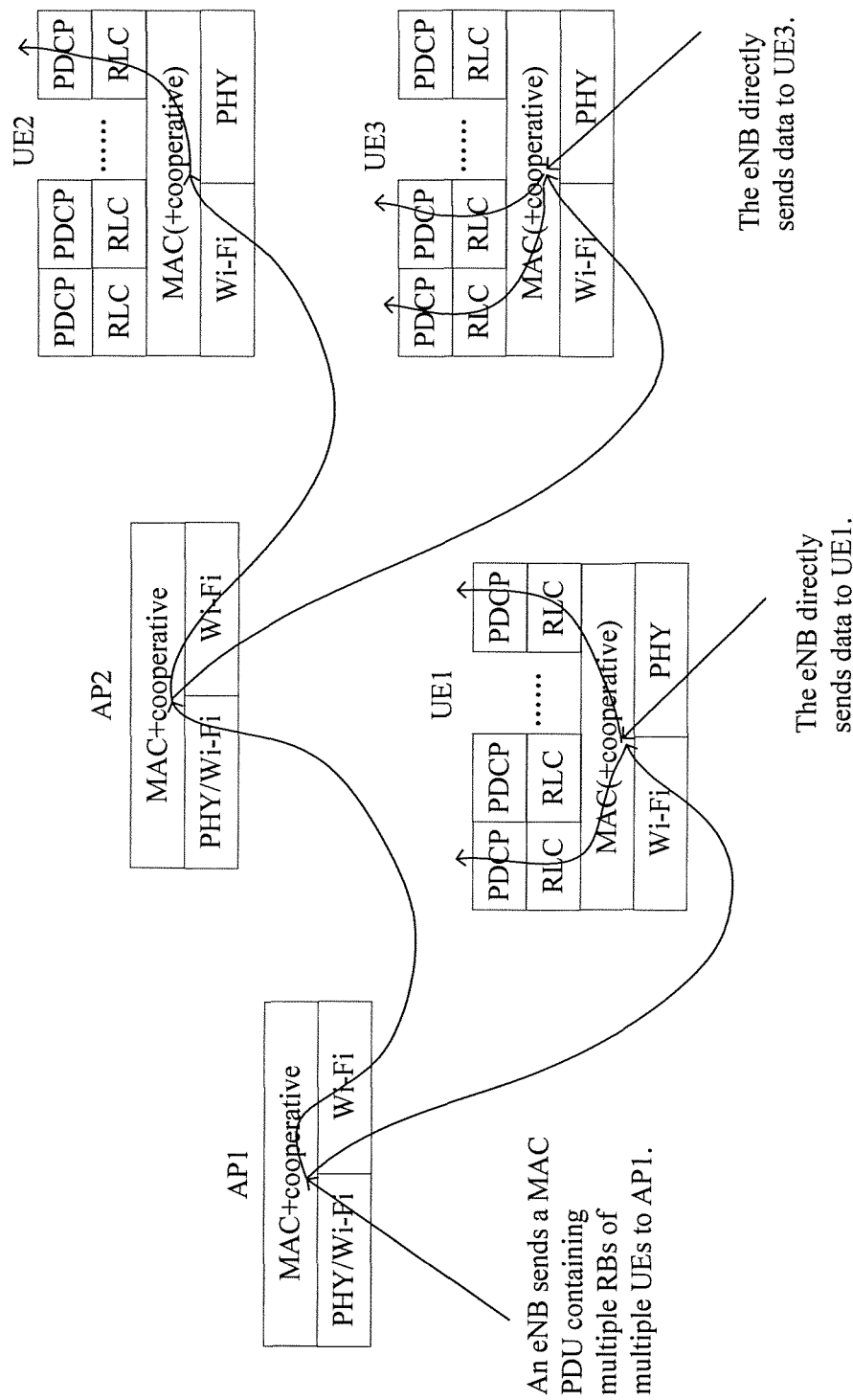
FIG. 6 is a forwarding flow chart when a cooperative layer is on a MAC layer.

Then, the forwarding process is described by using a cooperative layer on a medium access control (MAC) layer as an example. Referring to FIG. 6, FIG. 6 is a flow chart of forwarding when a cooperative layer is on a MAC layer. The cooperative layer provides data distribution and merging, control of channel quality, bearer mapping and other functions. The procedure will be described in details in the following.

As shown in FIG. 6, AP1 is a support AP of UE1, AP2 is a support AP of UE2 and UE3, and AP2 is one of the related APs of AP1. That is, AP1 and AP2 are two APs in a multiple users cooperative communication system. In this embodiment, Wi-Fi protocol is employed as the short distance transfer protocol. AP1 maintains the information of its supported benefited UE, UE1. In addition to the information of its supported benefited UEs, UE2 and UE3, AP2 still maintains information of other APs which are likely to perform cooperation with AP2, for example, the information of the benefited UE, UE1, supported by AP2.

Data delivered by the eNB refers to a MAC packet data unit (MAC PDU) of multiple radio bearers (RB) of multiple UEs. After AP1 receives the MAC PDU, AP1 will perform demultiplexing on data of different APs. Data of UE1 in the MAC PDU is directly sent to UE1 by using the Wi-Fi protocol, and then UE1 receives data according to the bearer mapping relationship of its own cooperative layer.

Figure 7:
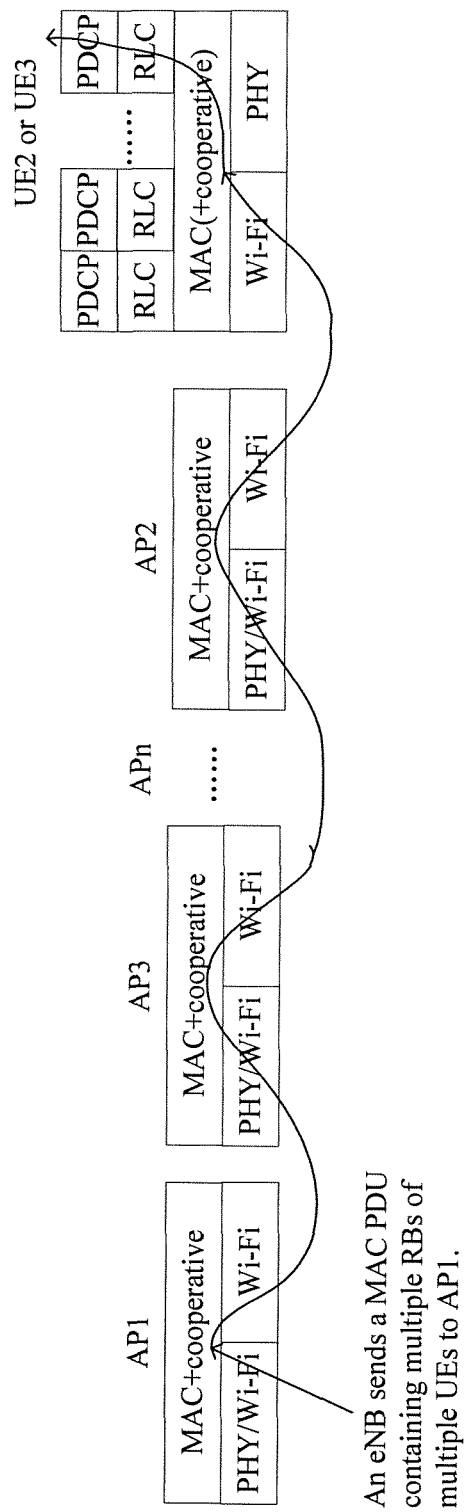
FIG. 7 is a flow chart for multiple times of forwarding.

For data of UE2 and UE3 in the MAC PDU, AP1 searches for support APs of UE2 and UE3 in the correspondence table of the address of support APs and the identifier and/or address information of the benefited UE according to the identifier and/or address information of UE2 and UE3, respectively, and then forwards data to the support AP (AP2) of UE2 and UE3 by using the Wi-Fi protocol, so that AP2 respectively sends data of UE2 and UE3 to UE2 and UE3 after receiving the data. Alternatively, when AP1 fails to forward data of UE2 and UE3 to AP2 due to a poor network channel between AP1 and AP2, AP1 may continue to select an AP having a good channel near AP2, so that data of UE2 and UE3 is finally forwarded to AP2 after multiple times of forwarding between the APs. The flow chart of multiple times of forwarding is shown in FIG. 7, where the eNB may also directly send the data to the benefited UE without the forwarding of a support AP.

When the cooperative layer is on the MAC layer, according to a framework of a protocol stack, the foregoing identifier and address information of the benefited UE may be a mapping relationship between a UE identifier in the MAC header and a UE address and a mapping relationship between a logical channel identify (LCID) and the UE address, respectively. A related AP that receives the data can determine, according to a UE identifier displayed in a MAC header, or according to an LCID, to which UE data in a MAC PDU belongs, and then find out, from UE information maintained by the related AP, which AP supports the UE.

A method for finding out, according to the correspondence table of the address of support AP and the identifier and/or address information of the benefited UE, to which support AP a benefited UE belongs may be as follows: an address of a transfer layer of the short distance transfer protocol of a support AP is searched for according to the identifier and/or address information of benefited UE, and the related APs may forward data to the support AP according to the address of a transfer layer of the short distance transfer protocol. That the short distance transfer protocol is Wi-Fi is used as an example, the address herein is only the address of the Wi-Fi transfer layer of the support AP supporting the benefited UE, which is similar to that of other short distance transmission technologies, and will not be repeated herein. A related AP that receives the data does not have an actual address of the benefited UE, and just forwards the data to the support AP according to the address of the Wi-Fi transfer layer. After receiving the data, the support AP determines, according to a UE identifier, or according to the mapping between the LCID and the UE address, to which UE the data belongs, and then searches for the actual address of the Wi-Fi transfer layer of the benefited UE, and further sends the data to the benefited UE. In this embodiment, AP2 needs to search for the actual address of the Wi-Fi transfer layer of the benefited UE according to the UE identifier displayed in the MAC header or LCID, and therefore, AP2 still needs the cooperative layer.

Through the foregoing forwarding manner, a data forwarding problem existing when data sent to the benefited UE by an eNB is forwarded in a forwarding path greater than 2 hops can be solved, so that multiple users cooperative communication between APs becomes possible. Through the multiple users cooperative communication between the APs, data to be sent to a UE by an eNB may be sent to a support AP at first, and then sent to the UE by the support AP. When the support AP is in a poor network environment, the eNB may send data to other APs near the support AP, and then data is forwarded to the support AP through one more times of forwarding between other APs. In this way, the eNB may select an AP having the best channels from several APs and then deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 8:
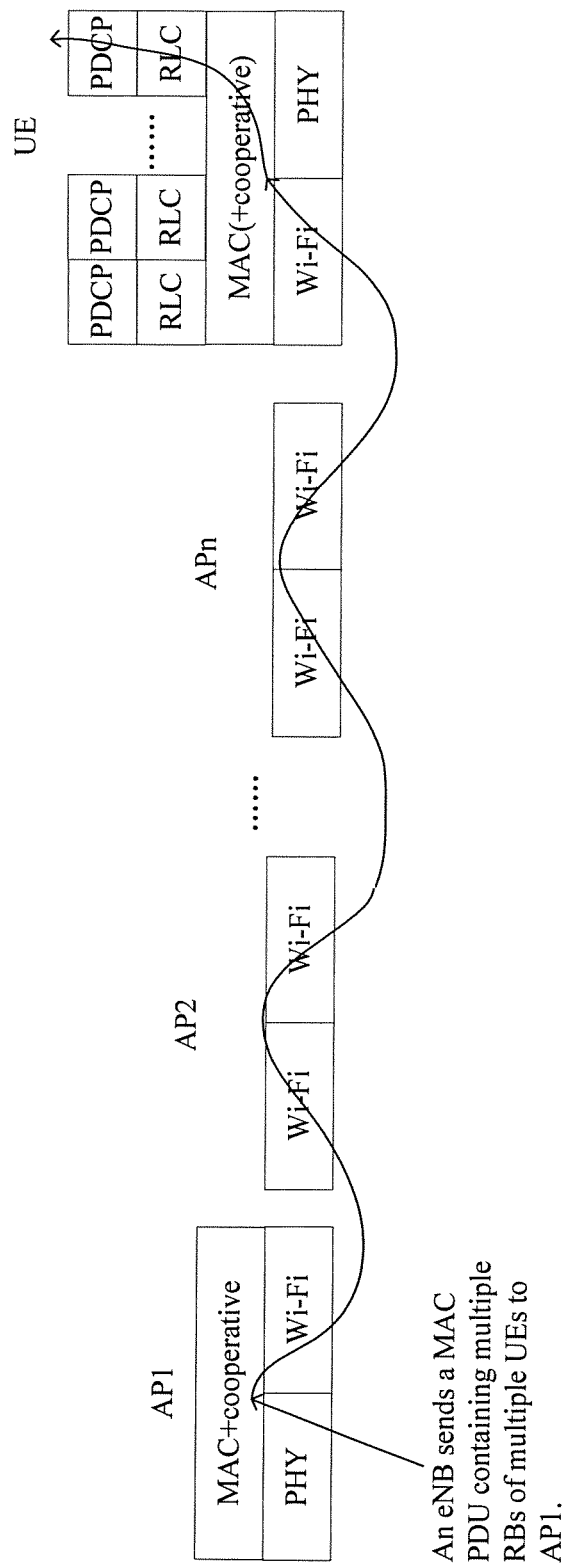
FIG. 8 is another forwarding flow chart when a cooperative layer is on a MAC layer.

FIG. 8 is another forwarding flow chart when a cooperative layer is on a MAC layer. The method for forwarding data may be as follows.

After the first AP receiving data in the related APs receives the data, the address of the benefited UE is obtained according to the identifier and/or address information; the first AP receiving data in the related APs forwards the data to the support AP according to the address of the benefited UE; or, the first AP receiving the data in the related APs forwards the data to another AP in the related APs, so that another AP in the related APs is used as a router to forward the data to the support AP, or used as a router to forward the data to another AP in the related APs, and the data is finally forwarded to the support AP after multiple times of forwarding between the APs, where the first AP receiving data in the related APs has a cooperative layer, and other APs in the related APs used as a router to forward data have no cooperative layer.

The first AP (AP1) receiving the data directly finds the address of the UE according to the identifier and/or address information of the UE, the APs (AP2-APn) for multiple times of forwarding are just used as a router, and no new layer or function is added any more, and therefore, there is no cooperative layer above AP2-APn in the framework of the protocol stack.

Figure 9:
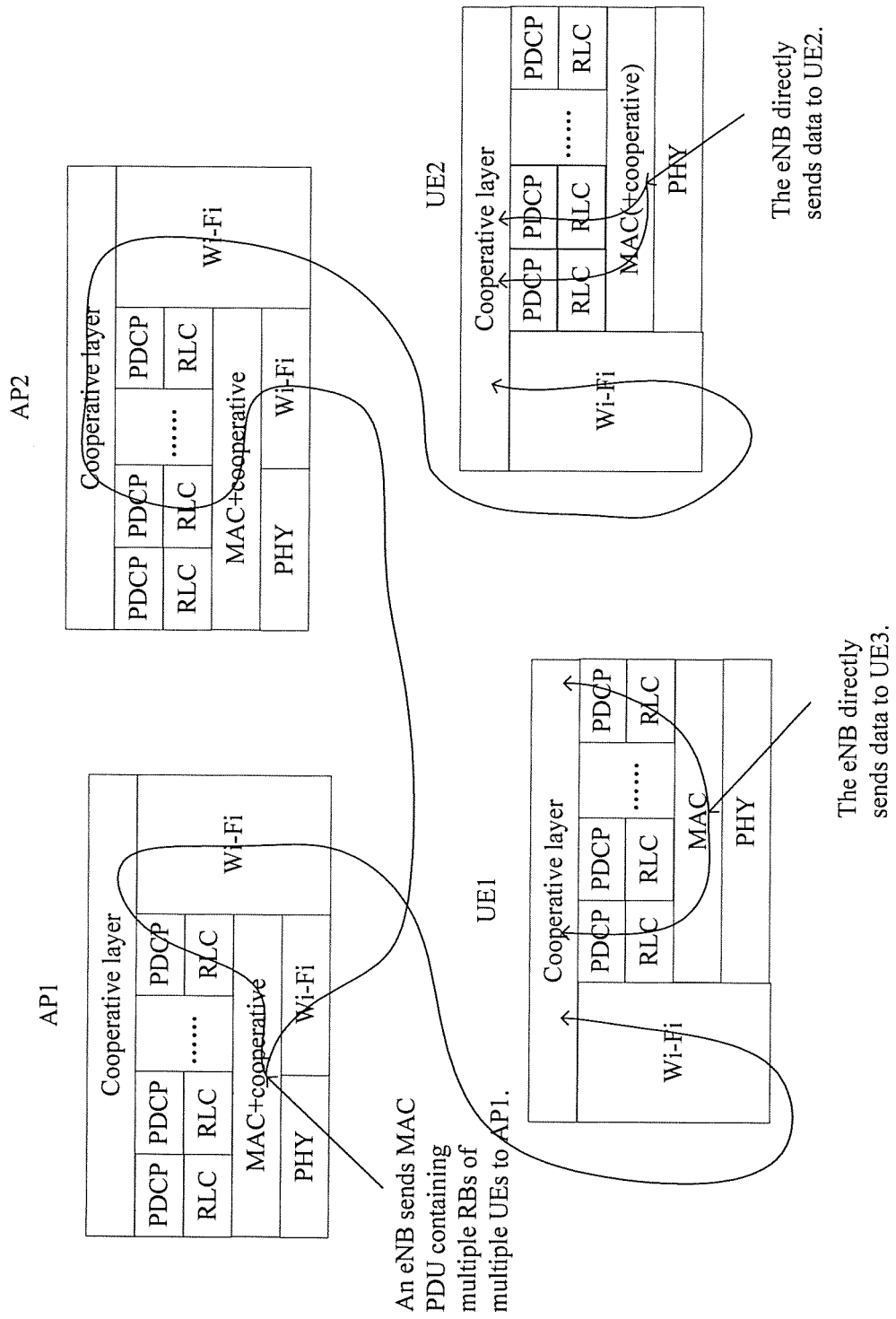
FIG. 9 is a forwarding flow chart when a cooperative layer is above a PDCP layer.

Referring to FIG. 9, FIG. 9 is a forwarding flow chart when a cooperative layer is above a PDCP layer. The embodiments of FIG. 6, FIG. 7, and FIG. 8 use a MAC layer as an example to describe the multihop forwarding solutions of the multiple users cooperative communication of the present invention. Actually, the multiple users cooperative communication technology of the present invention may be in a higher level, for example, above a MAC layer, above a radio link control (RLC) layer, above a packet data convergence protocol (PDCP). This embodiment uses a cooperative layer being above a PDCP layer as an example to describe the forwarding process in details.

Compared with the embodiments of FIG. 6, FIG. 7, and FIG. 8, the most significant difference of the embodiment of FIG. 9 is that the protocol stack has different frameworks. As shown in FIG. 9, under the framework of the protocol stack, the support AP and the benefited UE are in cooperative communication on the PDCP layer, and the cooperative bearer of the benefited UE is built on the support AP. The related APs do not need to build the cooperative bearer of the benefited UE. The related APs receive data, and directly forward a part of MAC PDUs of the benefited UE to the support AP or other related APs by using the short distance transfer protocol, for example, Wi-Fi protocol, according to the UE identifier and/or address information of the MAC layer. When the MAC PDU of the benefited UE is forwarded to the support AP, the support AP performs cooperative bearer processing of the benefited UE, and then sends data to the benefited UE.

As shown in FIG. 9, AP1 is a support AP of UE1, AP2 is a support AP of UE2, and AP2 is a related AP of AP1. After receiving MAC PDUs, AP1 performs cooperative bearer processing on a part of MAC PDUs of UE1, and sends data to the benefited UE1. A part of MAC PDUs of UE1 are forwarded to AP2 on the MAC layer by using the Wi-Fi protocol, and AP2 performs cooperative bearer processing of UE2 and sends data to UE2.

In the foregoing forwarding manner, a data forwarding problem existing when data sent to a benefited UE by an eNB is forwarded in a forwarding path greater than 2 hops can be solved, so that multiple users cooperative communication between APs becomes possible. After the multiple users cooperative communication between the APs, data to be sent to a UE by an eNB may be sent to a support AP at first, and then sent to the UE by the support AP. When the support AP is in a poor network environment, the eNB may send data to another AP near the support AP, and then the data is forwarded to the support AP after one or more times of forwarding between other APs. In this way, the eNB may select an AP having the best channel from several APs and then deliver the data to the AP, thereby achieving an effect of multiuser diversity. The problems of increased power consumption and complexity resulted from MUCC are transferred to APs, and a majority of UEs are released.

Figure 10:
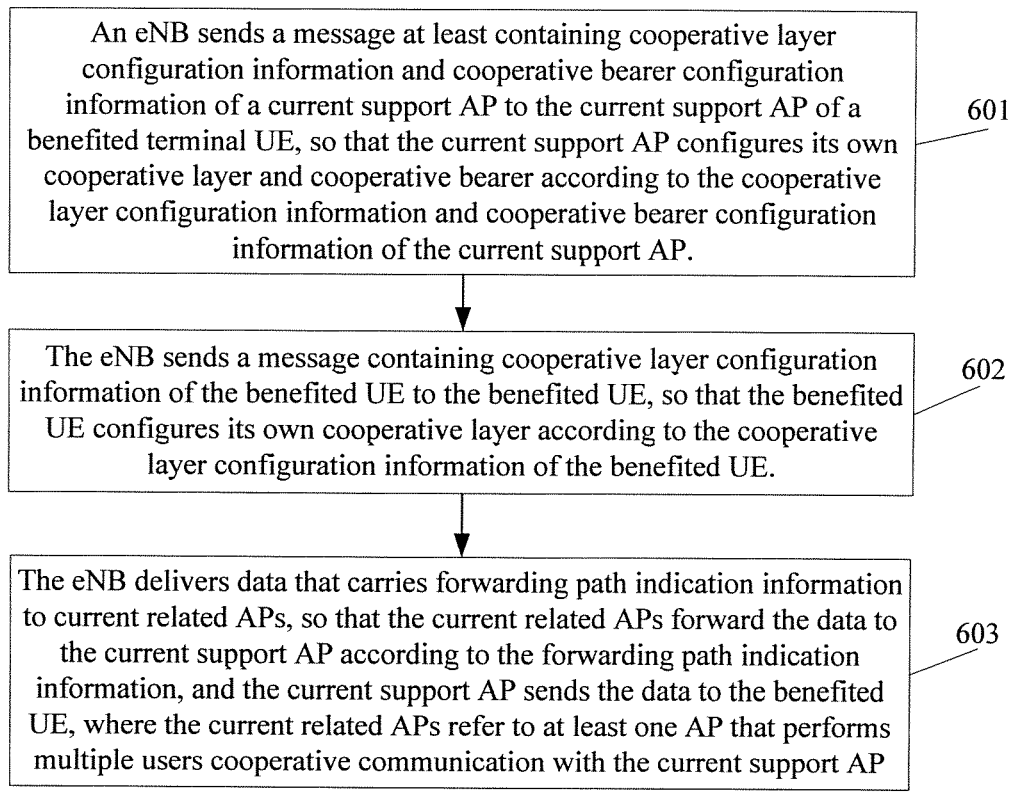
FIG. 10 is a flow chart of a multiple users cooperative communication method according to an embodiment of the present invention.

Referring to FIG. 10, FIG. 10 is a flow chart of a multiple users cooperative communication method according to an embodiment of the present invention, including:

601: An eNB sends a message at least containing cooperative layer configuration information and cooperative bearer configuration information of a current support AP to the current support AP of a benefited UE, so that the current support AP configures its own cooperative layer and cooperative bearer according to the cooperative layer configuration information and cooperative bearer configuration information of the current support AP.

602: The eNB sends a message containing cooperative layer configuration information of the benefited UE to the benefited UE, so that the benefited UE configures its own cooperative layer according to the cooperative layer configuration information of the benefited UE.

603: The eNB delivers data that carries forwarding path indication information to current related APs, so that the current related APs forward the data to the current support AP according to the forwarding path indication information, and the current support AP sends the data to the benefited UE, where the current related APs refer to at least one AP that performs multiple users cooperative communication with the current support AP.

In this embodiment, through multiple users cooperative communication between APs, data to be sent to a UE by an eNB may be sent to a support AP at first, and then sent to the UE by the support AP. A forwarding path of data between APs is indicated by display of forwarding path indication information, the transfer APs do not record information of any UE other than the benefited UE supported by the transfer APs. When the support AP is in a poor network environment, the eNB may send the data to other APs near the support AP, and then the data is forwarded to the support AP after one or more times of forwarding between other APs. In this way, the eNB can select an AP having the best channel from several APs and then deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 11:
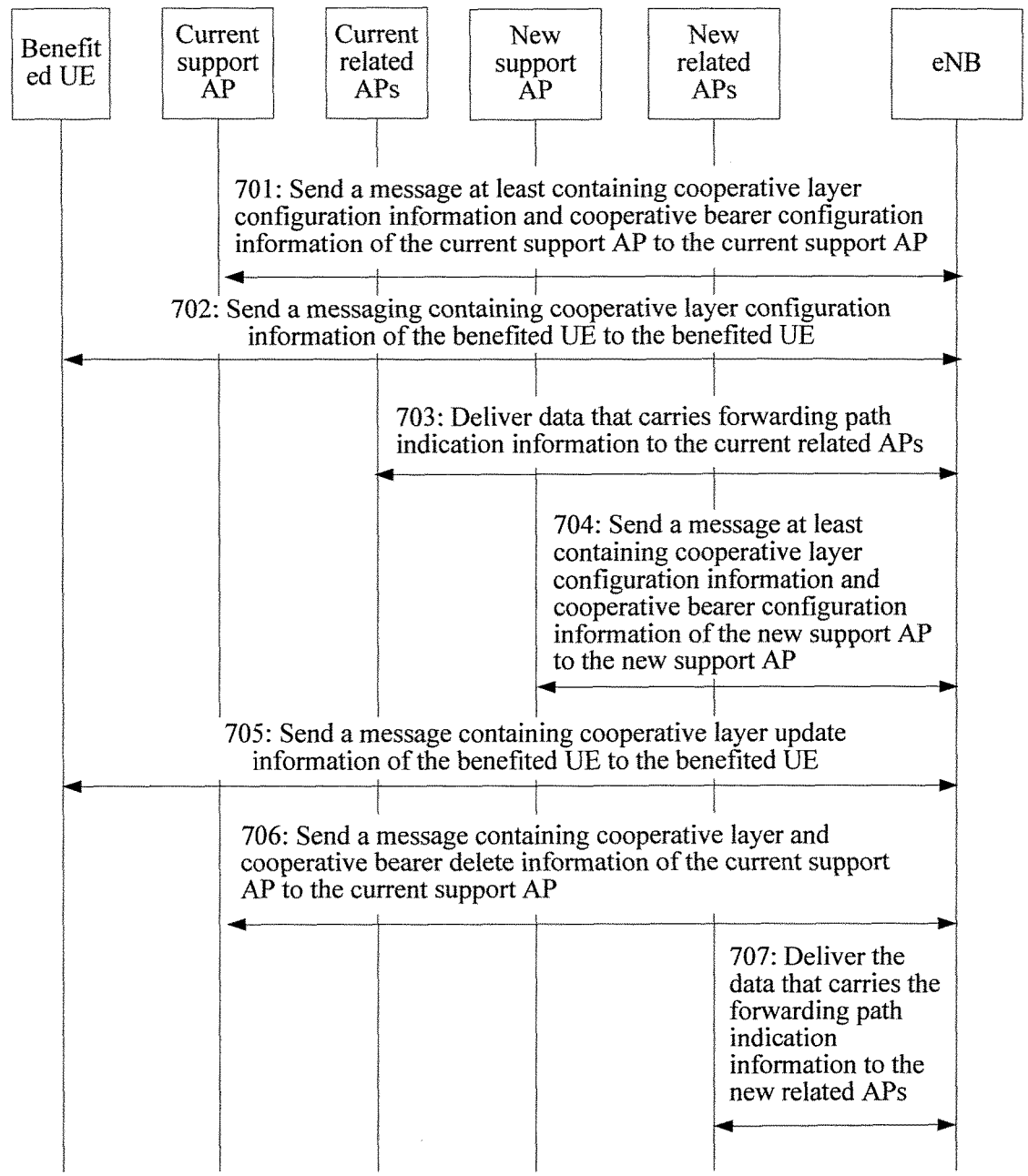
FIG. 11 is a flow chart of another multiple users cooperative communication method according to an embodiment of the present invention.

Referring to FIG. 11, FIG. 11 is a flow chart of another multiple users cooperative communication method according to an embodiment of the present invention, including:

701: An eNB sends a message at least containing cooperative layer configuration information and cooperative bearer configuration information of a current support AP to the current support AP.

The evolved NodeB eNB sends the message at least containing the cooperative layer configuration information and cooperative bearer configuration information of the current support AP to the current support access point AP of a benefited UE, so that the current support AP configures its own cooperative layer and cooperative bearer according to the cooperative layer configuration information and cooperative bearer configuration information of the current support AP.

702: The eNB sends a message containing cooperative layer configuration information of the benefited UE to the benefited UE.

The eNB sends the message containing the cooperative layer configuration information of the benefited UE to the benefited UE, so that the benefited UE configures its own cooperative layer according to the cooperative layer configuration information of the benefited UE.

703: The eNB delivers data that carries forwarding path indication information to current related APs.

The eNB delivers the data that carries the forwarding path indication information to the current related APs, so that the current related APs forward the data to the current support AP according to the forwarding path indication information, and the current support AP sends the data to the benefited UE, where the current related APs refer to at least one AP that performs multiple users cooperative communication with the current support AP.

When the benefited UE moves, the AP providing support for the benefited UE is likely to change. When the eNB detects that the benefited UE moves, and selects a new support AP for the benefited UE, the eNB also executes the following step 704 to step 707:

704: The eNB sends a message at least containing cooperative layer configuration information and cooperative bearer configuration information of the new support AP to the new support AP.

The eNB detects whether the benefited UE moves to a new support AP, if yes, the eNB sends the message at least containing the cooperative layer configuration information and cooperative bearer configuration information of the new support AP to the new support AP, so that the new support AP configures its own cooperative layer and cooperative bearer according to the cooperative layer configuration information and cooperative bearer configuration information of the new support AP.

705: The eNB sends a message containing cooperative layer update information of the benefited UE to the benefited UE The eNB sends the message containing the cooperative layer update information of the benefited UE to the benefited UE, so that the benefited UE updates its own cooperative layer according to the message of the cooperative layer update information of the benefited UE.

706: The eNB delivers data that carries forwarding path indication information to new related APs.

The eNB delivers the data that carries the forwarding path indication information to the new related APs, so that the new related APs forward the data to the new support AP according to the forwarding path indication information, and the new support AP sends the data to the benefited UE, where the new related APs refer to at least one AP that performs multiple users cooperative communication with the new support AP.

707: The eNB sends a message containing cooperative layer and cooperative bearer delete information of the current support AP to the current support AP.

The eNB sends the message containing the cooperative layer and cooperative bearer delete information of the current support AP to the current support AP, so that the current support AP deletes its own cooperative layer and cooperative bearer configurations.

In this embodiment, through multiple users cooperative communication between APs, data to be sent to a UE by an eNB may be sent to a support AP at first, and then sent to the UE by the support AP. A forwarding path of data between APs is indicated by display of forwarding path indication information, the transfer APs do not record information of any UE other than the benefited UE supported by the transfer APs. In this method, when a UE moves, and the support AP and the related APs change, only the current support AP and the new support AP are in signaling interaction with the network, and the related APs do not need to maintain the information of the benefited UE supported by an AP that may be in cooperative communication with the related APs, so that the signaling overhead is reduced greatly. When the support AP is in a poor network environment, the eNB can send the data to other APs near the support AP, and then the data is forwarded to the support AP after one or more times of forwarding between other APs. In this way, the eNB can select an AP having the best channel from several APs and then deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 12:
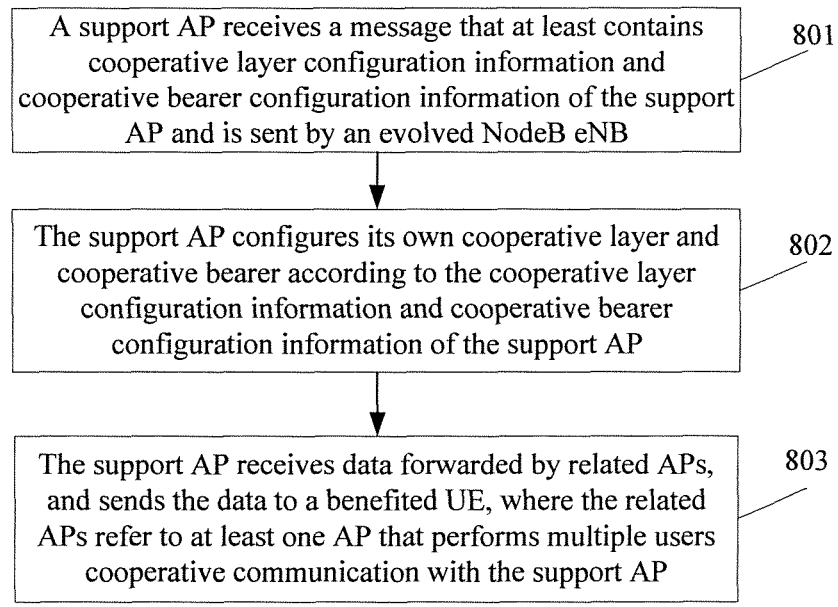
FIG. 12 is a flow chart of a multiple users cooperative communication method according to the present invention.

Referring to FIG. 12, FIG. 12 is a flow chart of a multiple users cooperative communication method according to an embodiment of the present invention. In this embodiment, the present invention is described from a perspective of a support AP. The method includes:

801: The support AP receives a message that at least contains cooperative layer configuration information and cooperative bearer configuration information of the support AP and is sent by an evolved NodeB eNB.

802: The support AP configures its own cooperative layer and cooperative bearer according to the cooperative layer configuration information and cooperative bearer configuration information of the support AP.

803: The support AP receives data forwarded by related APs, and sends the data to a benefited UE, where the related APs refer to at least one AP that performs multiple users cooperative communication with the support AP.

If the benefited UE moves, the AP providing support for the benefited UE needs to change. After selecting a new support AP, the eNB will send a message containing cooperative layer and cooperative bearer delete information of the support AP to the support AP before movement, and the method further includes:

receiving the message that contains cooperative layer and cooperative bearer delete information of the support AP and is sent by the eNB; and deleting the configured cooperative layer and cooperative bearer according to the cooperative layer and cooperative bearer delete information of the support AP.

In this embodiment, when the support AP of the benefited UE is in a poor network environment currently, the eNB may select a related AP having a good channel from the related APs and deliver data to be sent to the benefited UE to the related AP, and then the related AP forwards the data to the support AP, and finally the support AP sends the data to the benefited UE. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 13:
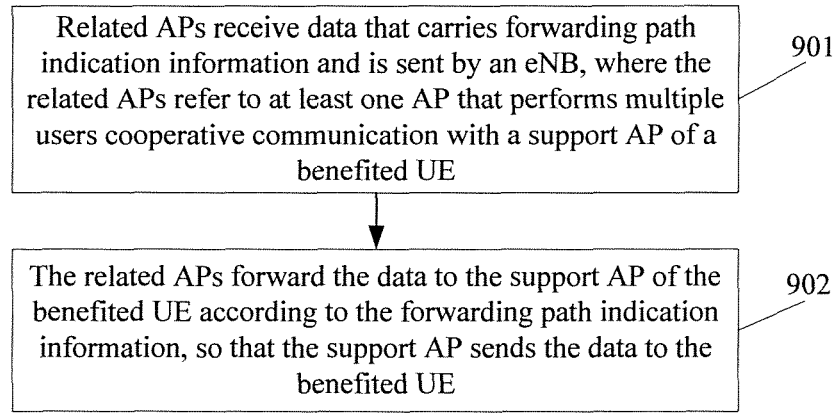
FIG. 13 is a flow chart of a multiple users cooperative communication method according to the present invention.

Referring to FIG. 13, FIG. 13 is a flow chart of a multiple users cooperative communication method according to an embodiment of the present invention. In this embodiment, the present invention is described from a perspective of related APs. The method includes:

901: The related APs receive data that carries forwarding path indication information and is sent by an eNB, where the related APs refer to at least one AP that performs multiple users cooperative communication with a support AP of a benefited UE.

902: The related APs forward the data to the support AP of the benefited UE according to the forwarding path indication information, so that the support AP sends the data to the benefited UE.

The specific method in which the related APs forward the data to the support AP of the benefited UE according to the forwarding path indication information, so that the support AP sends the data to the benefited UE may be as follows.

Any AP receiving data in the related APs directly forwards the data to the support AP according to the forwarding path indication information, or one AP in the related APs forwards the data to another AP in the related APs other than the one AP after receiving the data, so that the data reaches the support AP after one or more times of forwarding between the related APs.

In this embodiment, the method for forwarding data between the related APs is specifically as follows: The AP receiving data in the related APs performs demultiplexing on data not belonging to this AP, and then forwards the data to a corresponding AP in the related APs according to an AP ID domain; the AP receiving data in the related APs performs demultiplexing on its own data and forwards the data to a corresponding UE.

Figure 14:
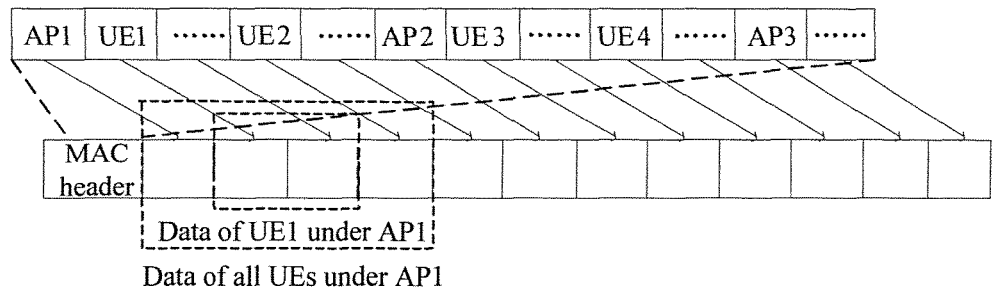
FIG. 14 is a schematic diagram of a MAC PDU format.
Figure 15:
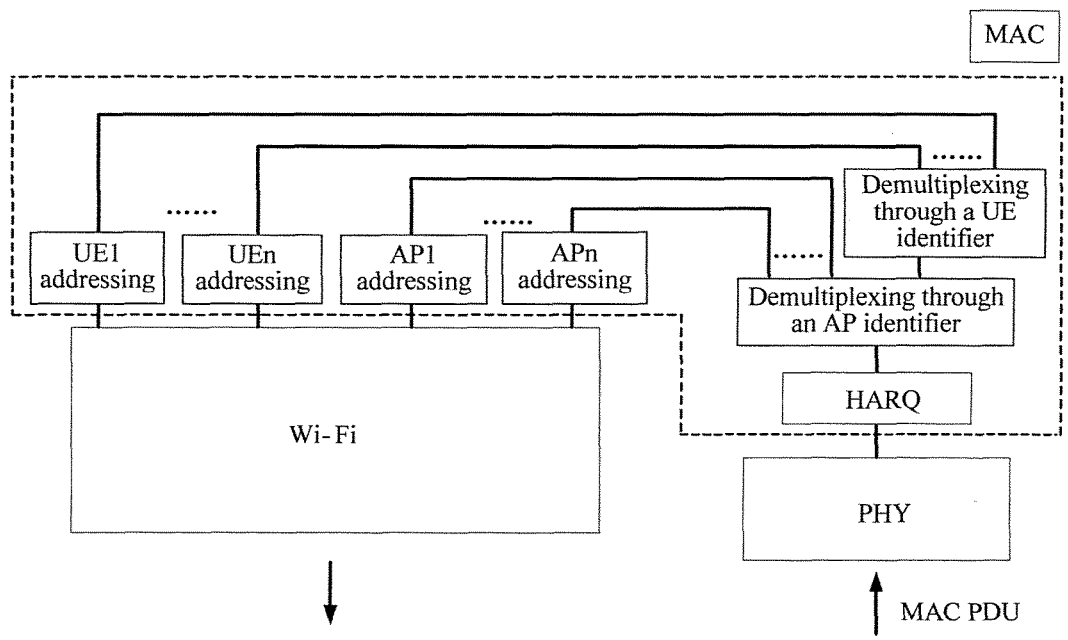
FIG. 15 is a processing flow chart after related APs receive a MAC PDU.

The format of a MAC PDU may be shown in FIG. 14. A new LCID is added to indicate the AP ID domain. After receiving the data of the benefited UE not supported by the related APs, the related APs forward the data according to an indication of an AP ID domain on the MAC PDU. The related APs receiving data only maintain the address information of the benefited UE supported by the related APs, and do not maintain the address information of the benefited UE of other APs that performs multiple users cooperative communication with the related APs any more. Under such a MAC PDU structure, the function of the MAC layer in the APs will change. After an AP receives the MAC PDU, the processing procedures are shown in FIG. 15.

When the cooperative layer is on the MAC layer, the MAC layer of an AP receives one MAC PDU, and then performs demultiplexing on data of different APs and forwards data to each AP according to the AP ID domain; and, the MAC layer performs demultiplexing on data of multiple benefited UEs supported by the AP, and then sends the data to each benefited UE.

When the cooperative layer is above the PDCP layer, the MAC layer of an AP receives a MAC PDU, and then performs demultiplexing on data of different APs and forwards the data to each AP according to the AP ID domain; and, the MAC layer performs demultiplexing on data of the benefited UE supported by the AP, and then sends the data of different benefited UEs to a cooperative bearer built by each benefited UE.

In this embodiment, when the benefited UE moves, the eNB only reconfigures a cooperative layer and cooperative bearer of the new support AP and the benefited UE, and deletes the cooperative layer and cooperative bearer of the original support AP. Only the original support AP, the new support AP, and the benefited UE are in signaling interaction with the eNB, and the related APs do not need to maintain a large amount of identifier and address information of the benefited UE not supported by the related APs, so that the signaling overhead of the whole network and the information amount maintained by the related APs are reduced.

Figure 16:
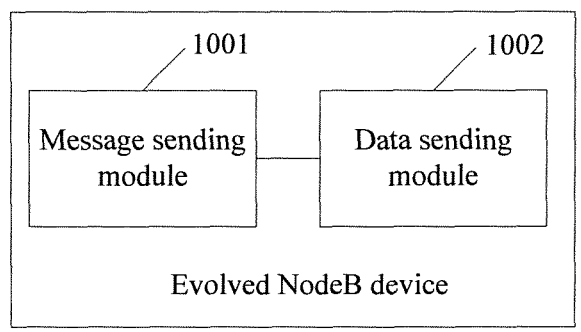
FIG. 16 is a structural diagram of an evolved NodeB device according to an embodiment of the present invention.

Referring to FIG. 16, FIG. 16 is a structural diagram of an evolved NodeB device according to an embodiment of the present invention, including a message sending module 1001 and a data sending module 1002.

The message sending module 1001 is configured to send a message at least containing cooperative layer configuration information and cooperative bearer configuration information of a current support AP to the current support access point AP of a benefited UE, so that the current support AP configures its own cooperative layer and cooperative bearer according to the cooperative layer configuration information and cooperative bearer configuration information of the current support AP.

The message sending module 1001 is further configured to send identifier and/or address information of the benefited UE to current related APs, where the current related APs refer to at least one AP that performs multiple users cooperative communication with the current support AP.

The message sending module 1001 is further configured to send a message containing cooperative layer configuration information of the benefited UE to the benefited UE, so that the benefited UE configures its own cooperative layer according to the cooperative layer configuration information of the benefited UE.

The data sending module 1002 is configured to deliver data to the current related APs, so that the current related APs forward the data to the current support AP according to the identifier and/or address information of the benefited UE sent by the message sending module, and the current support AP sends the data to the benefited UE.

When the evolved NodeB device does not directly send data to be sent to the benefited UE to the support AP due to the poor network environment of the support AP or other reasons, the evolved NodeB device may send data to an AP in the related APs. This AP receives data and forwards the data to the support AP according to the identifier and/or address information of the benefited UE, or forwards the data to another AP in the related APs, so that the data is finally forwarded to the support AP after one or more times of forwarding between the related APs, and the support AP further sends the data to the benefited UE.

In this embodiment, through multiple users cooperative communication between APs, data to be sent to a UE by an evolved NodeB device may be sent to a support AP at first, and then the support AP sends the data to the UE; and when the support AP is in a poor network environment, the evolved NodeB device may send the data to other APs near the support AP, and finally forward the data to the support AP after one or more times of forwarding between the other APs. In this way, the evolved NodeB device may select an AP having the best channel from several APs and deliver the data to the AP, thereby achieving an effect of multiuser diversity. The problems of increased power consumption and complexity resulted from MUCC are transferred to APs, and a majority of UEs are released. The UE in this embodiment has a simple structure, low power consumption, and high reliability of communication.

Figure 17:
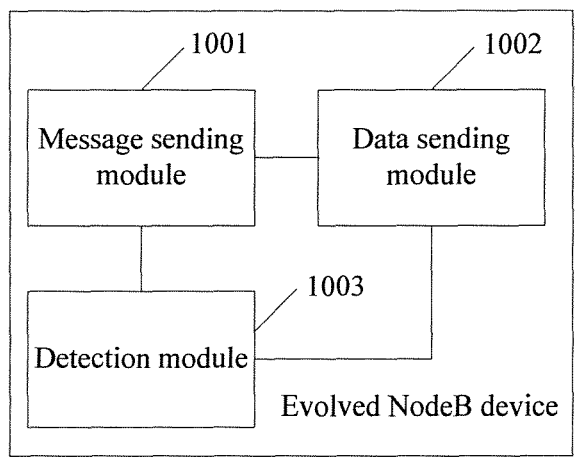
FIG. 17 is a structural diagram of another evolved NodeB device according to an embodiment of the present invention.

Referring to FIG. 17, FIG. 17 is a structural diagram of another evolved NodeB device according to an embodiment of the present invention, including a message sending module 1001, a data sending module 1002, and a detection module 1003.

The detection module 1003 is configured to detect whether a benefited UE moves to a new support AP.

In addition to the functions described in the embodiment of FIG. 16, the message sending module 1001 and the data sending module 1002 still have other functions as follows:

The message sending module 1001 is further configured to send a message at least containing cooperative layer configuration information and cooperative bearer configuration information of the new support AP to the new support AP after the detection module 1003 detects that the benefited UE moves to the new support AP, so that the new support AP configures its own cooperative layer and cooperative bearer according to the cooperative layer configuration information and cooperative bearer configuration information of the new support AP.

The message sending module 1001 is further configured to send identifier and/or address information of the benefited UE to new related APs after the detection module 1003 detects that the benefited UE moves to the new support AP, where the new related APs refer to at least one AP that performs multiple users cooperative communication with the new support AP.

The message sending module 1001 is further configured to send a message containing cooperative layer update information of the benefited UE to the benefited UE after the detection module 1003 detects that the benefited UE moves to the new support AP, so that the benefited UE updates its own cooperative layer according to the message of the cooperative layer update information of the benefited UE.

The data sending module 1002 is further configured to deliver data to the new related APs after the detection module 1003 detects that the benefited UE moves to the new support AP, so that the new related APs forward the data to the new support AP according to the identifier and/or address information of the benefited UE, and the new support AP sends the data to the benefited UE.

The message sending module 1001 is further configured to send a message containing cooperative layer and cooperative bearer delete information of the current support AP to the current support AP, so that the current support AP deletes its own cooperative layer and cooperative bearer configurations.

The message sending module 1001 is further configured to send a message containing information for deleting the identifier and/or address information of the benefited UE to the current related APs, so that the current related APs delete the identifier and/or address information of the benefited UE.

Figure 18:
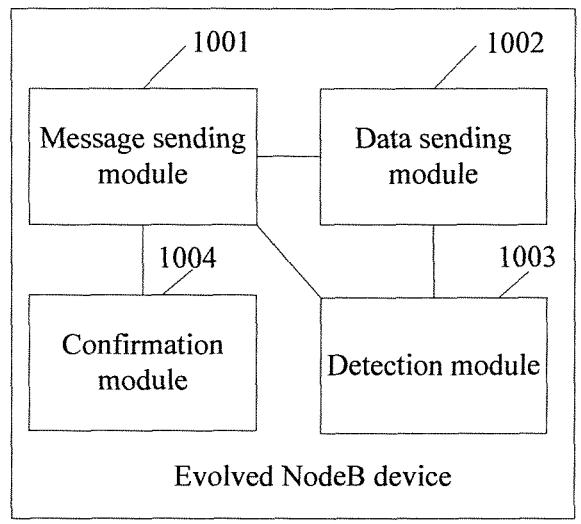
FIG. 18 is a structural diagram of another evolved NodeB device according to an embodiment of the present invention.

The evolved NodeB device in the embodiment of FIG. 17 may further include a confirmation module 1004 shown in FIG. 18. The confirmation module 1004 is configured to confirm whether the new related APs are the same as the current related APs.

When the confirmation module 1004 confirms that the new related APs have a same part of APs as the current related APs, when number of the current related AP are multiple, the message sending module 1001 sends the message containing the information for deleting the identifier and/or address information of the benefited UE to a part of APs that are in the current related APs and different from the new related APs, so that the part of APs that are in the current related APs and different from the new related APs delete the identifier and/or address information of the benefited UE.

When the confirmation module 1004 confirms that the new related APs are totally different from the current related APs, the message sending module 1001 sends the message containing the information for deleting the identifier and/or address information of the benefited UE to each AP in the current related APs, so that each AP in the current related APs deletes the identifier and/or address information of the benefited UE.

In this embodiment, through the multiple users cooperative communication between the APs, data to be sent to a UE by an evolved NodeB device may be sent to a support AP at first, and then the support AP sends the data to the UE; and when the support AP is in a poor network environment, the evolved NodeB device may send the data to other APs near the support AP, and finally forward the data to the support AP through one or more times of forwarding between the other APs. In this way, the evolved NodeB device may select an AP having the best channel from several APs and deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 19:
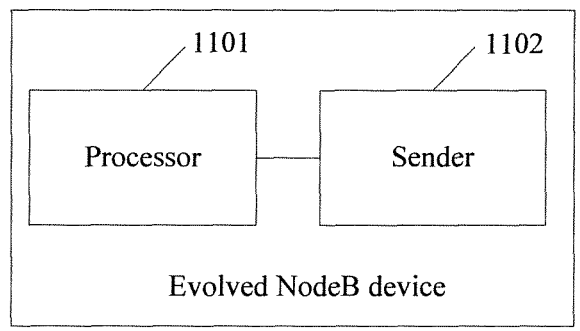
FIG. 19 is a structural diagram of an evolved NodeB device according to an embodiment of the present invention.

Referring to FIG. 19, FIG. 19 is a structural diagram of an evolved NodeB device according to an embodiment of the present invention, including a processor 1101 and a sender 1102.

The sender 1102 is configured to send a message at least containing cooperative layer configuration information and cooperative bearer configuration information of a current support AP to the current support access point AP of a benefited UE, so that the current support AP configures its own cooperative layer and cooperative bearer according to the cooperative layer configuration information and cooperative bearer configuration information of the current support AP.

The sender 1102 is further configured to send the identifier and/or address information of the benefited UE to current related APs, where the current related APs refer to at least one AP that performs multiple users cooperative communication with the current support AP.

The sender 1102 is further configured to send a message containing cooperative layer configuration information of the benefited UE to the benefited UE, so that the benefited UE configures its own cooperative layer according to the cooperative layer configuration information of the benefited UE.

The processor 1101 is further configured to deliver data to the current related APs, so that the current related APs forward the data to the current support AP according to the identifier and/or address information of the benefited UE sent by the sender, and the current support AP sends the data to the benefited UE;

The processor 1101 is further configured to detect whether the benefited UE moves to a new support AP; if the processor 1101 detects that the benefited UE moves to the new support AP, the sender 1102 is further configured to send a message at least containing cooperative layer configuration information and cooperative bearer configuration information of the new support AP to the new support AP, so that the new support AP configures its own cooperative layer and cooperative bearer according to the cooperative layer configuration information and cooperative bearer configuration information of the new support AP.

The sender 1102 is further configured to send the identifier and/or address information of the benefited UE to new related APs, where the new related APs refer to at least one AP that performs multiple users cooperative communication with the new support AP.

The sender 1102 is further configured to send a message containing cooperative layer update information of the benefited UE to the benefited UE, so that the benefited UE updates its own cooperative layer according to the message of the cooperative layer update information of the benefited UE.

The processor 1101 is further configured to deliver data to the new related APs, so that the new related APs forward the data to the new support AP according to the identifier and/or address information of the benefited UE, and the new support AP sends the data to the benefited UE.

The sender 1102 is further configured to send a message containing cooperative layer and cooperative bearer delete information of the current support AP to the current support AP, so that the current support AP deletes its own cooperative layer and cooperative bearer configurations; and send a message containing information for deleting the identifier and/or address information of the benefited UE to the current related APs, so that the current related APs delete the identifier and/or address information of the benefited UE.

In this embodiment, through the multiple users cooperative communication between the APs, data to be sent to a UE by an evolved NodeB device may be sent to a support AP at first, and then the support AP sends the data to the UE; and when the support AP is in a poor network environment, the evolved NodeB device may send the data to other APs near the support AP, and finally forward the data to the support AP through one or more times of forwarding between the other APs. In this way, the evolved NodeB device may select an AP having the best channel from several APs and deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 20:
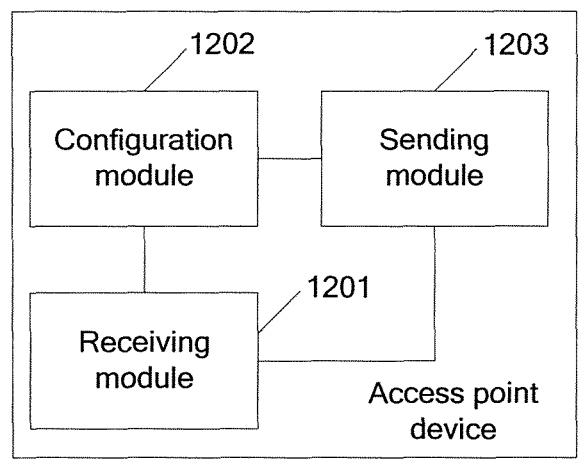
FIG. 20 is a structural diagram of an access point device according to an embodiment of the present invention.

Referring to FIG. 20, FIG. 20 is a structural diagram of an access point device according to an embodiment of the present invention. The access point device is a support AP providing support for a benefited UE. The access point device includes a receiving module 1201, a configuration module 1202, and a sending module 1203.

The receiving module 1201 is configured to receive a message that at least contains cooperative layer configuration information and cooperative bearer configuration information of the access point device and is sent by an evolved NodeB eNB.

The configuration module 1202 is configured to configure a cooperative layer and cooperative bearer of the access point device according to the cooperative layer configuration information and cooperative bearer configuration information of the access point device received by the receiving module.

The receiving module 1201 is further configured to receive data forwarded by related APs, where the related APs refer to at least one AP that performs multiple users cooperative communication with the access point device.

The sending module 1203 is configured to send the data received by the receiving module to the benefited UE.

Figure 21:
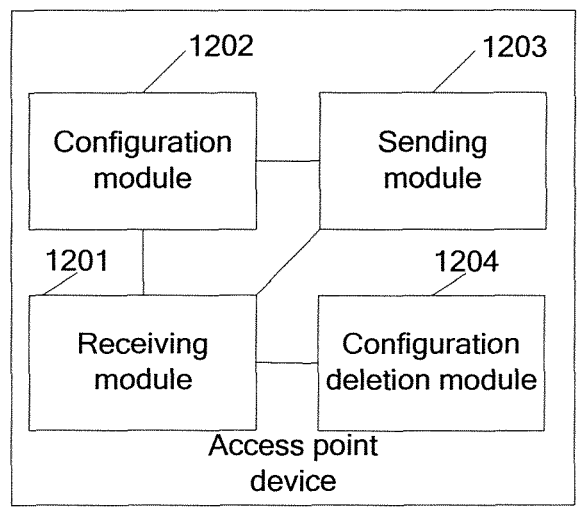
FIG. 21 is a structural diagram of another access point device according to an embodiment of the present invention.

The receiving module 1201 is further configured to receive a message that contains cooperative layer and cooperative bearer delete information of the access point and is sent by the eNB, the access point device may further include a configuration deletion module 1204, as shown in FIG. 21. The configuration deletion module 1204 is configured to delete the configured cooperative layer and cooperative bearer according to the cooperative layer and cooperative bearer delete information of the access point received by the receiving module.

In this embodiment, when the access point device is in a poor network environment currently, the eNB may select a related AP having a good channel from the related APs and deliver the data to be sent to a benefited UE to the related AP. Then, the related AP forwards the data to the access point device, and the access point device sends the data to the benefited UE. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 22:
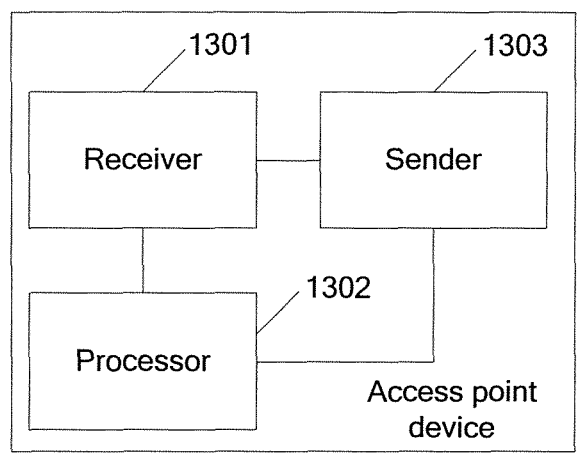
FIG. 22 is a structural diagram of an access point device according to an embodiment of the present invention.

Referring to FIG. 22, FIG. 22 is a structural diagram of an access point device according to an embodiment of the present invention. The access point device includes a receiver 1301, a processor 1302, and a sender 1303.

The receiver 1301 is configured to receive a message that at least contains cooperative layer configuration information and cooperative bearer configuration information of the access point device and is sent by an evolved NodeB eNB.

The processor 1302 is configured to configure a cooperative layer and cooperative bearer of the access point device according to the cooperative layer configuration information and cooperative bearer configuration information of the access point device received by the receiver.

The receiver 1301 is further configured to receive data forwarded by related APs, where the related APs refer to at least one AP that performs multiple users cooperative communication with the access point device.

The sender 1303 is configured to send the data received by the receiver to the benefited UE.

The receiver 1301 is further configured to receive a message that contains cooperative layer and cooperative bearer delete information of the access point device and is sent by the eNB.

The processor 1302 is further configured to delete the configured cooperative layer and cooperative bearer according to the cooperative layer and cooperative bearer delete information of the access point device received by the receiver 1301.

In this embodiment, when the access point device is in a poor network environment currently, the eNB may select a related AP having a good channel from the related APs and deliver the data to be sent to a benefited UE to the related AP. Then, the related AP forwards the data to the access point device, and the access point device sends the data to the benefited UE. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 23:
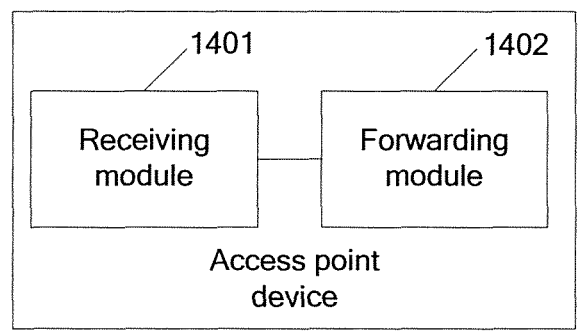
FIG. 23 is a structural diagram of an access point device according to an embodiment of the present invention.

Referring to FIG. 23, FIG. 23 is a structural diagram of an access point device according to an embodiment of the present invention. The access point device is used as an AP that performs multiple users cooperative communication with a support access point AP of a benefited UE. The access point device includes a receiving module 1401 and a forwarding module 1402.

The receiving module 1401 is configured to receive identifier and/or address information of the benefited UE sent by an evolved NodeB eNB.

The receiving module 1401 is further configured to receive data sent by the eNB.

The forwarding module 1402 is configured to send the data received by the receiving module to the support AP according to the identifier and/or address information of the benefited UE received by the receiving module, so that the support AP sends the data to the benefited UE.

The forwarding module 1402 is specifically configured to directly forwarding the data to the support AP according to the identifier and/or address information of the benefited UE, or forward data to another access point device that performs multiple users cooperative communication with the support AP, so that the data reaches the support AP after one or more times of forwarding between access point devices.

Figure 24:
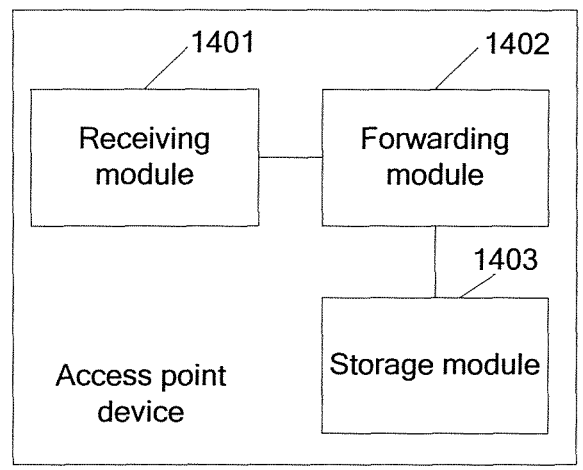
FIG. 24 is a structural diagram of another access point device according to an embodiment of the present invention.

In this embodiment, the access point device may further include a storage module 1403, as shown in FIG. 24. The storage module 1403 is configured to store a correspondence table of an address of the support AP and the identifier and/or address information of the benefited UE. The forwarding module 1402 is specifically configured to acquire the correspondence table of the address of the support AP and the identifier and/or address information of the benefited UE from the storage module 1403, search for address information of the support AP in the correspondence table of the address of the support AP and the identifier and/or address information of the benefited UE, and directly forward the data to the support AP according to the address information of the support AP.

Figure 25:
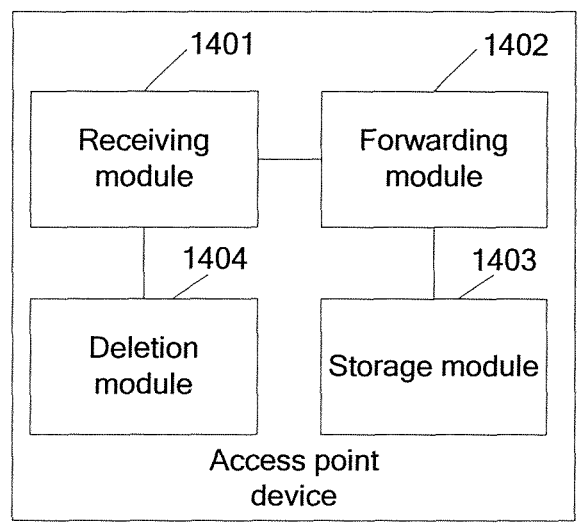
FIG. 25 is a structural diagram of another access point device according to an embodiment of the present invention.

In this embodiment, the access point device may further include a deletion module 1404, as shown in FIG. 25. The receiving module 1401 is further configured to receive a message that contains information for deleting the identifier and/or address information of the benefited UE and is sent by the eNB. The deletion module 1404 is configured to delete the identifier and/or address information of the benefited UE according to the information that is for deleting the identifier and/or address information of the benefited UE and is received by the receiving module 1401.

In this embodiment, data transmission between the eNB and the benefited UE is likely to have more than one time of forwarding. Solving the multihop forwarding of data between the APs that perform multiple users cooperative communication with each other becomes a key technology. For an implementation manner of multihop forwarding of data, reference may be made to embodiments of FIG. 6 to FIG. 9, and will not be repeated herein.

When the support AP is in a poor network environment currently, the eNB may send the data to another access point device near the support AP, and finally forward the data to the support AP after one or more times of forwarding between access point devices. In this way, the eNB may select an access point device having the best channel from several access point devices and deliver the data to the access point device, thereby achieving an effect of multiuser diversity. The problems of increased power consumption and complexity resulted from MUCC are transferred to APs, and a majority of UE are released. The multiple users cooperative communication between the APs saves the laying cost of optical fibers and other wired backhaul in the intensive networking, and can improve the reliability and transmission efficiency of MUCC.

Figure 26:
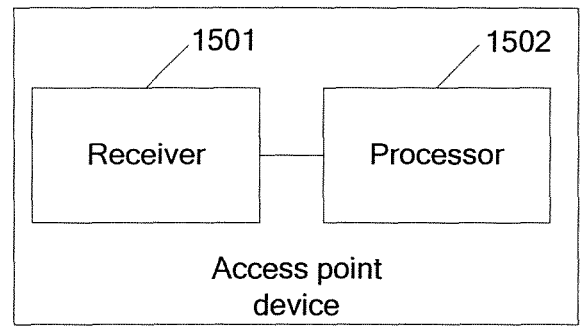
FIG. 26 is a structural diagram of an access point device according to an embodiment of the present invention.

Referring to FIG. 26, FIG. 26 is a structural diagram of an access point device according to an embodiment of the present invention. The access point device includes a receiver 1501 and a processor 1502.

The receiver 1501 is configured to receive identifier and/or address information of a benefited UE sent by an evolved NodeB eNB.

The receiver 1501 is further configured to receive data sent by the eNB.

The processor 1502 is configured to forward the data to the support AP according to the identifier and/or address information of the benefited UE received by the receiver, so that the support AP sends the data to the benefited UE.

The processor 1502 is specifically configured to:

directly forward the data to the support AP according to the identifier and/or address information of the benefited UE received by the receiver 1501, or forward the data to another access point device that performs multiple users cooperative communication with the support AP, so that the data reaches the support AP after one or more times of forwarding between access point devices.

Figure 27:
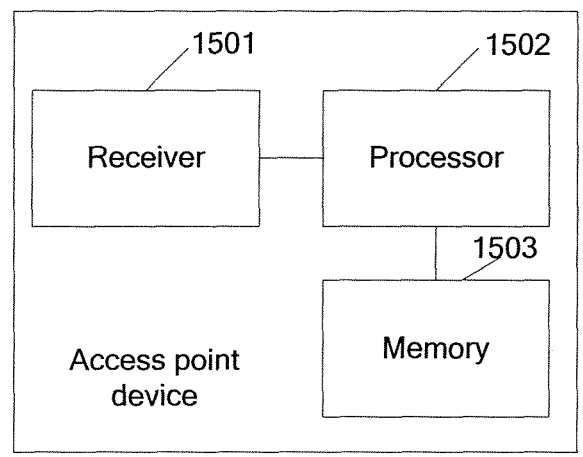
FIG. 27 is a structural diagram of another access point device according to an embodiment of the present invention.

The access point device may further include a memory 1503, as shown in FIG. 27. The memory 1503 is configured to store a correspondence table of an address of the support AP and the identifier and/or address information of the benefited UE. The processor 1502 is specifically configured to receive the data sent by the eNB, search for address information of the support AP in the correspondence table of the address of the support AP and the identifier and/or address information of the benefited UE in the memory 1503 according to the identifier and/or address information of the benefited UE received by the receiver, and directly forward the data to the support AP according to the address information of the support AP.

The receiver 1501 is further configured to receive a message that contains information for deleting the identifier and/or address information of the benefited UE and is sent by the eNB.

The processor 1502 is further configured to delete the identifier and/or address information of the benefited UE according to the information that is for deleting the identifier and/or address information of the benefited UE and is received by the receiver 1501.

When the support AP is in a poor network environment, the eNB may send the data to another access point device near the support AP, and finally forward the data to the support AP after one or more times of forwarding between access point devices. In this way, the eNB may select an access point device having the best channel from several access point devices and deliver the data to the access point device, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 28:
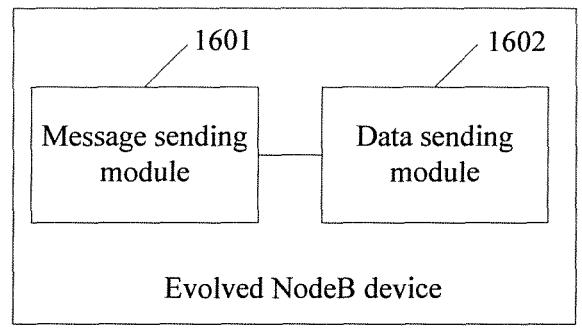
FIG. 28 is a structural diagram of an evolved NodeB device according to an embodiment of the present invention.

Referring to FIG. 28, FIG. 28 is a structural diagram of an evolved NodeB device according to an embodiment of the present invention. The evolved NodeB device includes a message sending module 1601 and a data sending module 1602.

The message sending module 1601 is configured to send a message at least containing cooperative layer configuration information and cooperative bearer configuration information of a current support AP to the current support access point AP of a benefited UE, so that the current support AP configures its own cooperative layer and cooperative bearer according to the cooperative layer configuration information and cooperative bearer configuration information of the current support AP.

The message sending module 1601 is further configured to send a message containing cooperative layer configuration information of the benefited UE to the benefited UE, so as to configure a cooperative layer of the benefited UE.

The data sending module 1602 is configured to deliver data that carries forwarding path indication information to current related APs, so that the current related APs forward the data to the current support AP according to the forwarding path indication information sent by the message sending module 1601, and the current support AP sends the data to the benefited UE, where the current related APs refer to at least one AP that performs multiple users cooperative communication with the current support AP.

Figure 29:
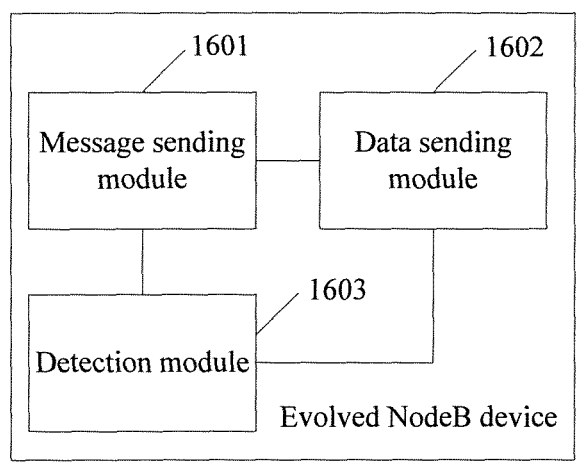
FIG. 29 is a structural diagram of another evolved NodeB device according to an embodiment of the present invention.

The evolved NodeB device may further include a detection module 1603, as shown in FIG. 29.

The detection module 1603 is configured to detect whether the benefited UE moves to a new support AP.

The message sending module 1601 is further configured to send a message at least containing cooperative layer configuration information and cooperative bearer configuration information of the new support AP to the new support AP when the detection module 1603 detects that the benefited UE moves to the new support AP, so that the new support AP configures its own cooperative layer and cooperative bearer according to the cooperative layer configuration information and cooperative bearer configuration information of the new support AP; and the message sending module 1601 is further configured to send a message containing cooperative layer update information of the benefited UE to the benefited UE, so as to update the cooperative layer of the benefited UE.

The data sending module 1602 is further configured to deliver data that carries forwarding path indication information to new related APs after the detection module detects that the benefited UE moves to the new support AP, so that the new related APs forward the data to the new support AP according to the forwarding path indication information, and the new support AP sends the data to the benefited UE, where the new related APs refer to at least one AP that performs multiple users cooperative communication with the new support AP.

The message sending module 1601 is further configured to send a message containing cooperative layer and cooperative bearer delete information of the current support AP to the current support AP after the detection module 1603 detects that the benefited UE moves to the new support AP, so that the current support AP deletes its own cooperative layer and cooperative bearer configurations.

In this embodiment, through multiple users cooperative communication between APs, data to be sent to a UE by an evolved NodeB device may be sent to a support AP at first, and then sent to the benefited UE by the support AP. A forwarding path of data between APs is indicated by display of forwarding path indication information, the transfer APs do not record information of any UE other than the benefited UE supported by the transfer APs. In this method, when a UE moves, and the support AP and the related APs change, only the current support AP and the new support AP are in signaling interaction with the network, and the related APs do not need to maintain the information of the benefited UE supported by an AP that may be in cooperative communication with the related APs, so that the signaling overhead is reduced greatly. When the support AP is in a poor network environment, the evolved NodeB device may send the data to other APs near the support AP, and then data is forwarded to the support AP after one or more times of forwarding between other APs. In this way, the evolved NodeB device may select an AP having the best channel from several APs and deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 30:
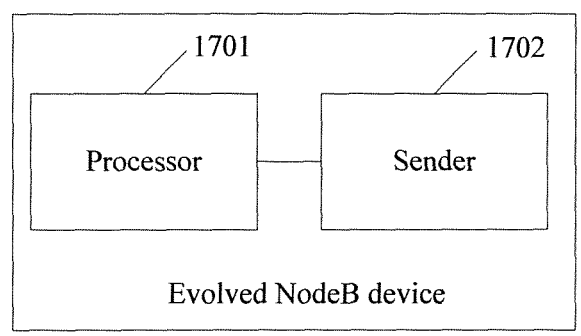
FIG. 30 is a structural diagram of an evolved NodeB device according to an embodiment of the present invention.

Referring to FIG. 30, FIG. 30 is a structural diagram of an evolved NodeB device according to an embodiment of the present invention. The evolved NodeB device includes a processor 1701 and a sender 1702.

The sender 1701 is configured to send a message at least containing cooperative layer configuration information and cooperative bearer configuration information of a current support access point AP to the current support access point AP of a benefited UE, so that the current support AP configures its own cooperative layer and cooperative bearer according to the cooperative layer configuration information and cooperative bearer configuration information of the current support AP.

The sender 1701 is further configured to send a message containing cooperative layer configuration information of the benefited UE to the benefited UE, so that the benefited UE configures its own cooperative layer according to the cooperative layer configuration information of the benefited UE.

The processor 1702 is configured to deliver data that carries forwarding path indication information to current related APs, so that the current related APs forward the data to the current support AP according to the forwarding path indication information, and the current support AP sends the data to the benefited UE, where the current related APs refer to at least one AP that performs multiple users cooperative communication with the current support AP.

The processor 1702 is further configured to detect whether the benefited UE moves to a new support AP.

The sender 1701 is further configured to send a message at least containing cooperative layer configuration information and cooperative bearer configuration information of the new support AP to the new support AP after the processor 1702 detects that the benefited UE moves to the new support AP, so that the new support AP configures its own cooperative layer and cooperative bearer according to the cooperative layer configuration information and cooperative bearer configuration information of the new support AP.

The sender 1701 is further configured to send a message containing cooperative layer update information of the benefited UE to the benefited UE after the processor 1702 detects that the benefited UE moves to the new support AP, so that the benefited UE updates its own cooperative layer according to the message of the cooperative layer update information of the benefited UE.

The processor 1702 is further configured to deliver the data that carries the forwarding path indication information to new related APs after the processor 1702 detects that the benefited UE moves to the new support AP, so that the new related APs forward the data to the new support AP according to the forwarding path indication information, and the new support AP sends the data to the benefited UE, where the new related APs refer to at least one AP that performs multiple users cooperative communication with the new support AP.

The sender 1701 is further configured to send a message containing cooperative layer and cooperative bearer delete information of the current support AP to the current support AP after the processor 1702 detects that the benefited UE moves to the new support AP, so that the current support AP deletes its own cooperative layer and cooperative bearer configurations.

In this embodiment, through multiple users cooperative communication between APs, data to be sent to a benefited UE by an evolved NodeB device may be sent to a support AP at first, and then sent to the benefited UE by the support AP. A forwarding path of data between APs is indicated by display of forwarding path indication information, the transfer APs do not record information of any UE other than the benefited UE supported by the transfer APs. In this method, when a UE moves, and the support AP and the related APs change, only the current support AP and the new support AP are in signaling interaction with the network, and the related APs do not need to maintain the information of the benefited UE supported by an AP that may be in cooperative communication with the related APs, so that the signaling overhead is reduced greatly. When the support AP is in a poor network environment, the evolved NodeB device may send the data to other APs near the support AP, and then the data is forwarded to the support AP after one or more times of forwarding between other APs. In this way, the eNB may select an AP having the best channel from several APs and deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 31:
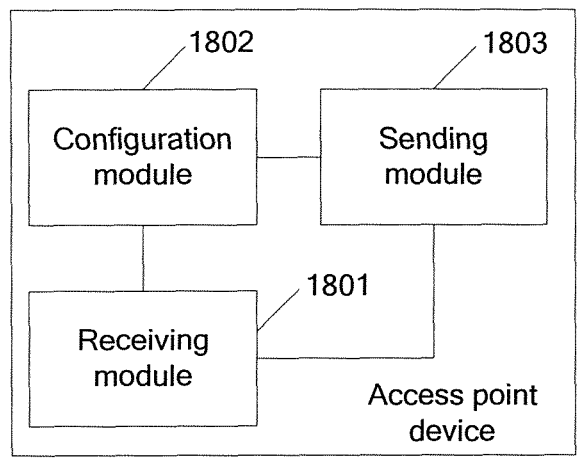
FIG. 31 is a structural diagram of an access point device according to an embodiment of the present invention.

Referring to FIG. 31, FIG. 31 is a structural diagram of an access point device according to an embodiment of the present invention. The access point device is used as a support AP of a benefited UE. The access point device includes a receiving module 1801, a configuration module 1802, and a sending module 1803.

The receiving module 1801 is configured to receive a message that at least contains cooperative layer configuration information and cooperative bearer configuration information of the access point device and is sent by an evolved NodeB eNB.

The configuration module 1802 is configured to configure a cooperative layer and cooperative bearer of the access point device according to the cooperative layer configuration information and cooperative bearer configuration information of the access point device received by the receiving module;

The receiving module 1801 is further configured to receive data forwarded by related APs, where the related APs refer to at least one AP that performs multiple users cooperative communication with the access point device;

The sending module 1803 is configured to send the data received by the receiving module to the benefited UE;

The receiving module 1801 is further configured to receive a message that contains cooperative layer and cooperative bearer delete information of the access point device and is sent by the eNB.

Figure 32:
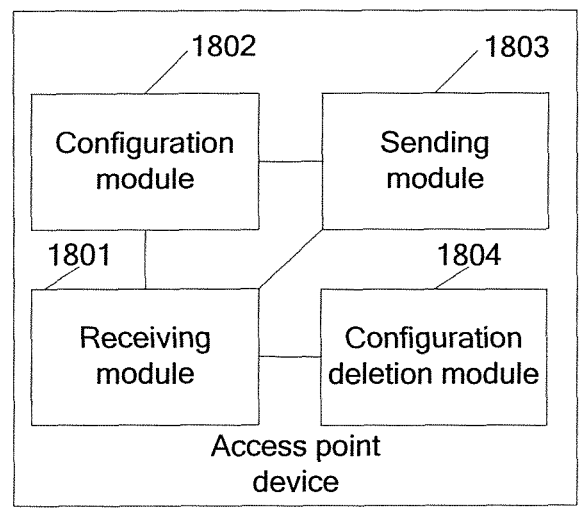
FIG. 32 is a structural diagram of another access point device according to an embodiment of the present invention.

The access point device may further include a configuration deletion module 1804, as shown in FIG. 32. The configuration deletion module 1804 is configured to delete the configured cooperative layer and cooperative bearer according to the cooperative layer and cooperative bearer delete information of the access point device received by the receiving module.

In this embodiment, when the access point device is in a poor network environment currently, the eNB may select a related AP having a good channel from several APs and deliver data to be sent to a benefited UE to the related AP. Then, the related AP forwards the data to the access point device, and finally the access point device sends the data to the benefited UE. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 33:
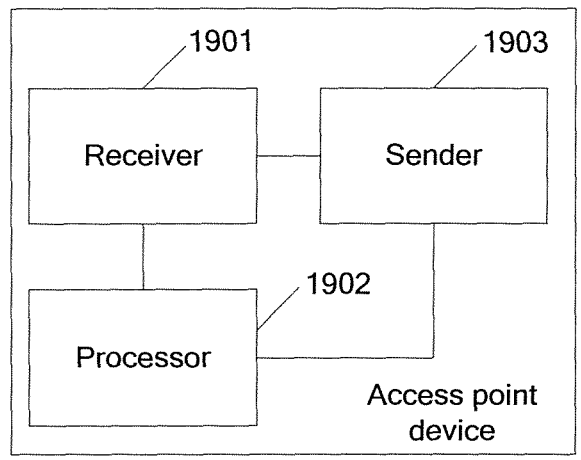
FIG. 33 is a structural diagram of an access point device according to an embodiment of the present invention.

Referring to FIG. 33, FIG. 33 is a structural diagram of an access point device according to an embodiment of the present invention. The access point device includes a receiver 1901, a processor 1902, and a sender 1903.

The receiver 1901 is configured to receive a message that at least contains cooperative layer configuration information and cooperative bearer configuration information of the access point device and is sent by an evolved NodeB eNB.

The processor 1902 is configured to configure a cooperative layer and cooperative bearer according to the cooperative layer configuration information and cooperative bearer configuration information of the access point device received by the receiver.

The receiver 1901 is further configured to receive data forwarded by related APs, where the related APs refer to at least one AP that performs multiple users cooperative communication with the access point device.

The sender 1903 is configured to send the data received by the receiver to the benefited UE.

The receiver 1901 is further configured to receive a message that contains cooperative layer and cooperative bearer delete information of the access point device and is sent by the eNB.

The processor 1902 is configured to delete the configured cooperative layer and cooperative bearer according to the cooperative layer and cooperative bearer delete information of the access point device received by the receiver.

In this embodiment, when the access point device is in a poor network environment currently, the eNB may select a related AP having a good channel from several APs and deliver data to be sent to a benefited UE to the related AP. Then, the related AP forwards the data to the access point device, and the access point device sends the data to the benefited UE. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

Figure 34:
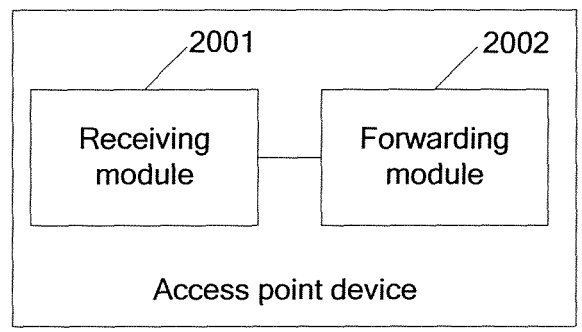
FIG. 34 is a structural diagram of an access point device according to an embodiment of the present invention.

Referring to FIG. 34, FIG. 34 is a structural diagram of an access point device according to an embodiment of the present invention. The access point device is used as an AP that performs multiple users cooperative communication with a support access point AP of a benefited UE. The access point device includes a receiving module 2001 and a forwarding module 2002.

The receiving module 2001 is configured to receive data that carries forwarding path indication information and is sent by an evolved NodeB eNB.

The forwarding module 2002 is configured to forward data to the support AP according to the forwarding path indication information contained in the data received by the receiving module, so that the support AP sends the data to the benefited UE.

The forwarding module 2002 is specifically configured to:

directly forward the data to the support AP according to the forwarding path indication information, or forward the data to another access point device that performs multiple users cooperative communication with the support AP, so that the data reaches the support AP after one or more times of forwarding between access point devices.

In this embodiment, the manner of forwarding data by the forwarding module 2002 is specifically as follows: After receiving data, the forwarding module performs demultiplexing on data not belonging to it, and then forwards the data to a corresponding AP in the related APs according to the AP ID domain; an AP receiving data in the related APs performs demultiplexing on its own data and then forwards the data to a corresponding UE. For a specific forwarding procedure, refer to the embodiments in FIG. 14 and FIG. 15, which will not be repeated herein.

In this embodiment, when a benefited UE moves, the eNB only reconfigures a cooperative layer and cooperative bearer of the new support AP and the benefited UE, and deletes the cooperative layer and cooperative bearer of the original support AP. Only the original support AP, the new support AP, and the benefited UE are in signaling interaction with the eNB, and the access point device does not need to maintain a large amount of identifier and address information of a UE not supported by the access point device, so that the signaling overhead of the whole network is reduced.

Figure 35:
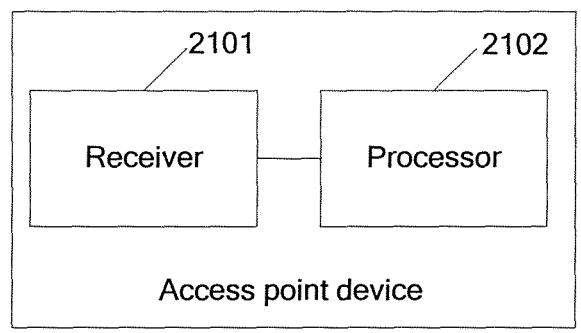
FIG. 35 is a structural diagram of an access point device according to an embodiment of the present invention.

Referring to FIG. 35, FIG. 35 is a structural diagram of an access point device according to an embodiment of the present invention, including a receiver 2101 and a processor 2102.

The receiver 2101 is configured to receive data that carries forwarding path indication information and is sent by an evolved NodeB eNB.

The processor 2102 is configured to forward the data to the support AP according to the forwarding path indication information contained in data received by the receiver 2101, so that the support AP sends the data to the benefited UE.

The processor 2102 is specifically configured to:

directly forward data to the support AP according to the forwarding path indication information received by the receiver 2101, or forward data to another access point device that performs multiple users cooperative communication with the support AP, so that the data reaches the support AP after one or more times of forwarding between access point devices.

In this embodiment, when a benefited UE moves, the eNB only reconfigures a cooperative layer and cooperative bearer of the new support AP and the benefited UE, and deletes the cooperative layer and cooperative bearer of the original support AP. Only the original support AP, the new support AP, and the benefited UE are in signaling interaction with the eNB, and the access point device does not need to maintain a large amount of identifier and address information of the benefited UE not supported by the access point device, so that the signaling overhead of the whole network is reduced.

An embodiment of the present invention further provides a multiple users cooperative communication system, including the evolved NodeB device shown in any embodiment of FIG. 16 to FIG. 18, the access point device shown in the embodiment of FIG. 20 or FIG. 21, and the access point device shown in any embodiment of FIG. 23 to FIG. 25, where the access point device shown in the embodiment of FIG. 20 or FIG. 21 is used as a support AP of a benefited UE, and the access point device shown in any embodiment of FIG. 23 to FIG. 25 is used as a related AP that performs multiple users cooperative communication with the support AP, where:

the evolved NodeB device is configured to send a message at least containing cooperative layer configuration information and cooperative bearer configuration information of the support AP to the support AP, send identifier and/or address information of the benefited UE to the related APs, send a message containing cooperative layer configuration information of the benefited UE to the benefited UE, and deliver data to any AP in the related APs.

The access point device shown in the embodiment of FIG. 20 or FIG. 21 is configured to receive the message that at least contains the cooperative layer configuration information and cooperative bearer configuration information of the support AP and is sent by the evolved NodeB device, configure its own cooperative layer and cooperative bearer according to the cooperative layer configuration information and cooperative bearer configuration information of the support AP, and receive data forwarded by the related APs and send the data to the benefited UE.

The access point device shown in any embodiment of FIG. 23 to FIG. 25 is configured to receive the identifier and/or address information of the benefited UE sent by the evolved NodeB device, receive data sent by the evolved NodeB device, and forward data to the support AP.

In this embodiment, through the multiple users cooperative communication between the access point device shown in the embodiment of FIG. 20 or FIG. 21 and the access point device shown in any embodiment of FIG. 23 to FIG. 25, data to be sent to the benefited UE by the evolved NodeB device may be sent to the support AP at first, and then sent to the UE by the support AP; and when the support AP in a poor network environment, the evolved NodeB device may send the data to other APs near the support AP, and finally forward the data to the support AP after one or more times of forwarding between other APs. In this way, the evolved NodeB device may select an AP having the best channel from several APs and deliver the data to the AP, thereby achieving an effect of multiuser diversity. In addition, the UE has a simple structure, low power consumption and high communication reliability of MUCC.

An embodiment of the present invention further provides a multiple users cooperative communication system, including the evolved NodeB device shown in the embodiment of FIG. 19, the access point device shown in the embodiment of FIG. 22, and the access point device shown in the embodiment of FIG. 26 or FIG. 27, where the access point device shown in the embodiment of FIG. 22 is used as a support AP of a benefited UE, and the access point device shown in the embodiment of FIG. 26 or FIG. 27 is used as a related AP that performs multiple users cooperative communication with the support AP, where:

the evolved NodeB device is configured to send a message at least containing cooperative layer configuration information and cooperative bearer configuration information of the support AP to the support AP, send identifier and/or address information of the benefited UE to the related APs, send a message containing cooperative layer configuration information of the benefited UE to the benefited UE, and deliver data to any AP in the related APs.

The access point device shown in the embodiment of FIG. 22 is configured to receive the message that at least contains the cooperative layer configuration information and cooperative bearer configuration information of the support AP and is sent by the evolved NodeB device, configure its own cooperative layer and cooperative bearer according to the cooperative layer configuration information and cooperative bearer configuration information of the support AP, and receive data forwarded by the related APs and send the data to the benefited UE.

The access point device shown in the embodiment of FIG. 26 or FIG. 27 is configured to receive the identifier and/or address information of the benefited UE sent by the evolved NodeB device, receive data sent by the evolved NodeB device, and forward data to the support AP.

In this embodiment, through the multiple users cooperative communication between the access point device shown in the embodiment of FIG. 20 or FIG. 21 and the access point device shown in the embodiment of FIG. 23 to FIG. 25, data to be sent to the benefited UE by the evolved NodeB device may be sent to the support AP at first, and then sent to the UE by the support AP; and when the support AP in a poor network environment, the evolved NodeB device may send the data to other APs near the support AP, and finally forward the data to the support AP after one or more times of forwarding between other APs. In this way, the evolved NodeB device may select an AP having the best channel from several APs and deliver the data to the AP, thereby achieving an effect of multiuser diversity. In addition, the UE has a simple structure, low power consumption and high communication reliability of MUCC.

An embodiment of the present invention further provides a multiple users cooperative communication system, including the evolved NodeB device shown in the embodiment of FIG. 28 or FIG. 29, the access point device shown in the embodiment of FIG. 31 or FIG. 32, and the access point device shown in the embodiment of FIG. 34, where the access point device shown in the embodiment of FIG. 31 or FIG. 32 is used as a support AP of a benefited UE, and the access point device shown in the embodiment of FIG. 34 is used as a related AP that performs multiple users cooperative communication with the support AP, where:

the evolved NodeB device is configured to send a message at least containing cooperative layer configuration information and cooperative bearer configuration information of the support AP to the support AP, send a message containing cooperative layer configuration information of the benefited UE to the benefited UE, and deliver data that carries forwarding path indication information to the related APs.

The access point device shown in the embodiment of FIG. 31 or FIG. 32 is configured to receive the message that at least contains the cooperative layer configuration information and cooperative bearer configuration information of the support AP and is sent by the evolved NodeB device, configure its own cooperative layer and cooperative bearer according to the cooperative layer configuration information and cooperative bearer configuration information of the support AP, and receive data forwarded by the related APs and send the data to the benefited UE.

The access point device shown in the embodiment of FIG. 34 is configured to receive data that carries forwarding path indication information and is sent by the evolved NodeB device, and forward data to the support AP according to the forwarding path indication information.

In this embodiment, through the multiple users cooperative communication between the access point device shown in the embodiment of FIG. 31 or FIG. 32 and the access point device shown in the embodiment of FIG. 34, data to be sent to a UE by an evolved NodeB device may be sent to a support AP at first, and then sent to the UE by the support AP. A forwarding path of data between APs is indicated by display of forwarding path indication infatuation, the transfer APs do not record infatuation of any UE other than the benefited UE supported by the transfer APs. In this method, when a UE moves, and the support AP and the related APs change, only the current support AP and the new support AP are in signaling interaction with the network, and the related APs do not need to maintain the information of the benefited UE supported by an AP that may be in cooperative communication with the related APs, so that the signaling overhead is reduced greatly. When the support AP is in a poor network environment, the evolved NodeB device may send the data to another AP near the support AP, and then the data is forwarded to the support AP after one or more times of forwarding between other APs. In this way, the evolved NodeB device may select an AP having the best channel from several APs and deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

An embodiment of the present invention further provides a multiple users cooperative communication system, including the evolved NodeB device shown in the embodiment of FIG. 30, the access point device shown in the embodiment of FIG. 33, and the access point device shown in FIG. 35, where the access point device shown in the embodiment of FIG. 33 is used as a support AP of a benefited UE, and the access point device shown in the embodiment of FIG. 35 is used as a related AP that performs multiple users cooperative communication with the support AP, where:

the evolved NodeB device is configured to send a message at least containing cooperative layer configuration information and cooperative bearer configuration information of the support AP to the support AP, send a message containing cooperative layer configuration information of the benefited UE to the benefited UE, and deliver data that carries forwarding path indication information to the related APs.

The access point device shown in the embodiment of FIG. 33 is configured to receive the message that at least contains the cooperative layer configuration infatuation and cooperative bearer configuration information of the support AP and is sent by the evolved NodeB device, configure its own cooperative layer and cooperative bearer according to the cooperative layer configuration information and cooperative bearer configuration information of the support AP, and receive data forwarded by the related APs and send the data to the benefited UE.

The access point device shown in the embodiment of FIG. 35 is configured to receive data that carries forwarding path indication information and is sent by the evolved NodeB device, and forward data to the support AP according to the forwarding path indication information.

In this embodiment, through the multiple users cooperative communication between the access point device shown in the embodiment of FIG. 33 and the access point device shown in the embodiment of FIG. 35, data to be sent to a UE by an evolved NodeB device may be sent to a support AP at first, and then sent to the UE by the support AP. A forwarding path of data between APs is indicated by display of forwarding path indication information, the transfer APs do not record information of any UE other than the benefited UE supported by the transfer APs. In this method, when a UE moves, and the support AP and the related APs change, only the current support AP and the new support AP are in signaling interaction with the network, and the related APs do not need to maintain the information of the benefited UE supported by an AP that may be in cooperative communication with the related APs, so that the signaling overhead is reduced greatly. When the support AP is in a poor network environment, the evolved NodeB device may send the data to another AP near the support AP, and then the data is forwarded to the support AP after one or more times of forwarding between other APs. In this way, the evolved NodeB device may select an AP having the best channel from several APs and deliver the data to the AP, thereby achieving an effect of multiuser diversity. The problems of increased power consumption and complexity resulted from MUCC are transferred to APs, and a majority of UEs are released. The multiple users cooperative communication between the APs saves the laying cost of optical fibers and other wired backhaul in the intensive networking, and can improve the reliability and transmission efficiency of MUCC.

A person of ordinary skill in the art may understand that all or a part of the processes of the methods in the foregoing embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (ROM), or a random access memory (RAM) or the like.

The foregoing descriptions are merely exemplary embodiments of the present invention, but are not intended to limit the protection scope of the present invention. Therefore, any equivalent variation made according to the claims of the present invention shall fall within the protection scope of the present invention.

What is claimed is:

1. A multiple users cooperative communication method, comprising:
    sending, by an evolved NodeB (eNB), a message comprising cooperative layer configuration information and cooperative bearer configuration information of a current support access point (AP) to the current support AP of a benefited user equipment (UE), wherein the current support AP configures a cooperative layer and cooperative bearer of the current support AP according to the cooperative layer configuration information and cooperative bearer configuration information;
    sending, by the eNB, at least one of identifier or address information of the benefited UE to a current related AP, wherein the current related AP refers to at least one AP that performs multiple users cooperative communication with the current support AP;
    sending, by the eNB, a message comprising cooperative layer configuration information of the benefited UE to the benefited UE, wherein the benefited UE configures a cooperative layer of the benefited UE according to the cooperative layer configuration information of the benefited UE;
    delivering, by the eNB, data to the current related AP, so that the current related AP forwards the data to the current support AP according to the at least one of identifier or address information of the benefited UE, and the current support AP sends the data to the benefited UE;
    detecting, by the eNB, that the benefited UE moves to a new support AP, and if yes:
    sending, by the eNB, a message comprising cooperative layer configuration information and cooperative bearer configuration information of the new support AP to the new support AP, so that the new support AP configures a cooperative layer and cooperative bearer of the new support AP according to the cooperative layer configuration information and cooperative bearer configuration information of the new support AP;
    sending, by the eNB, the at least one of identifier or address information of the benefited UE to new related APs, wherein the new related APs refer to at least one AP that performs multiple users cooperative communication with the new support AP;
    sending, by the eNB, a message comprising cooperative layer update information of the benefited UE to the benefited UE, so that the benefited UE updates the cooperative layer of the benefited UE according to the cooperative layer update information of the benefited UE;
    delivering, by the eNB, data to the new related APs, so that the new related APs forward the data to the new support AP according to the at least one of identifier or address information of the benefited UE, and the new support AP sends the data to the benefited UE; and
    when number of the current related AP are multiple and when the new related APs have a same part of APs as the current related APs, sending, by the eNB, a message comprising information for deleting the at least one of identifier or address information of the benefited UE to a part of APs that are in the current related APs and different from the new related APs, so that the part of APs that are in the current related APs and different from the new related APs delete the at least one of identifier or address information of the benefited UE.

2. The method according to claim 1, further comprising:
    sending, by the eNB, a message comprising cooperative layer and cooperative bearer delete information of the current support AP to the current support AP, so that the current support AP deletes the cooperative layer and cooperative bearer configurations of the current support AP.

3. A multiple users cooperative communication method, comprising:
    sending, by an evolved NodeB (eNB), a message comprising cooperative layer configuration information and cooperative bearer configuration information of a current support access point (AP) to the current support AP of a benefited user equipment (UE), wherein the current support AP configures a cooperative layer and cooperative bearer of the current support AP according to the cooperative layer configuration information and cooperative bearer configuration information;
    sending, by the eNB, at least one of identifier or address information of the benefited UE to a current related AP, wherein the current related AP refers to at least one AP that performs multiple users cooperative communication with the current support AP;
    sending, by the eNB, a message comprising cooperative layer configuration information of the benefited UE to the benefited UE, wherein the benefited UE configures a cooperative layer of the benefited UE according to the cooperative layer configuration information of the benefited UE;
    delivering, by the eNB, data to the current related AP, so that the current related AP forwards the data to the current support AP according to the at least one of identifier or address information of the benefited UE, and the current support AP sends the data to the benefited UE;
    detecting, by the eNB, that the benefited UE moves to a new support AP;
    sending, by the eNB, a message comprising cooperative layer configuration information and cooperative bearer configuration information of the new support AP to the new support AP, so that the new support AP configures a cooperative layer and cooperative bearer of the new support AP according to the cooperative layer configuration information and cooperative bearer configuration information of the new support AP;
    sending, by the eNB, the at least one of identifier or address information of the benefited UE to new related APs, wherein the new related APs refer to at least one AP that performs multiple users cooperative communication with the new support AP;

sending, by the eNB, a message comprising cooperative layer update information of the benefited UE to the benefited UE, so that the benefited UE updates the cooperative layer of the benefited UE according to the cooperative layer update information of the benefited UE;

delivering, by the eNB, data to the new related APs, so that the new related APs forward the data to the new support AP according to the at least one of identifier or address information of the benefited UE, and the new support AP sends the data to the benefited UE; and when number of the current related AP are multiple and if the new related APs are different from each AP in the current related APs, sending, by the eNB, a message comprising information for deleting the at least one of identifier or address information of the benefited UE to each AP in the current related APs, so that each AP in the current related APs deletes the at least one of identifier or address information of the benefited UE.

4. The method according to claim 3, sending, by the eNB, a message comprising cooperative layer and cooperative bearer delete information of the current support AP to the current support AP, so that the current support AP deletes the cooperative layer and cooperative bearer configurations of the current support AP.

5. A multiple users cooperative communication method, comprising:

receiving, by a related access point (AP), at least one of identifier or address information of a benefited user equipment (UE) sent by an evolved NodeB (eNB), wherein the related AP refers to at least one AP that performs multiple users cooperative communication with a support AP of the benefited UE;

storing, by the related AP, a correspondence table of an address of the support AP and the at least one of identifier or address information of the benefited UE;

receiving, by the related AP, data sent by the eNB, and searching for address information of the support AP in the correspondence table of the address of the support AP and the at least one of identifier or address information of the benefited UE according to the at least one of identifier or address information of the benefited UE; and forwarding, by the related AP, the data to the support AP according to the at least one of identifier or address information of the benefited UE as stored in the correspondence table, so that the support AP sends the data to the benefited UE by directly forwarding, by any AP receiving the data in the related AP, the data to the support AP according to the address information of the support AP; or when number of the related AP are multiple, after receiving the data, forwarding, by one AP in the related APs, the data to another AP other than the one AP in the related APs, so that the data reaches the support AP after one or more times of forwarding between the related APs.

6. The method according to claim 5, further comprising:

receiving, by the related AP, a message comprising information for deleting the at least one of identifier or address information of the benefited UE and is sent by the eNB; and deleting, by the related AP, the at least one of identifier or address information of the benefited UE according to the information for deleting the at least one of identifier or address information of the benefited UE.

7. An evolved NodeB device, comprising:

a transmitter;

a memory; and a processor connected to the transmitter and the memory, wherein the evolved NodeB device is configured to:

send a message comprising cooperative layer configuration information and cooperative bearer configuration information of a current support access point (AP) to the current support AP of a benefited user equipment (UE), wherein the current support AP configures a cooperative layer and cooperative bearer of the current support AP according to the cooperative layer configuration information and cooperative bearer configuration information;

send at least one of identifier or address information of the benefited UE to current related AP, wherein the current related AP refers to at least one AP that performs multiple users cooperative communication with the current support AP;

send a message comprising cooperative layer configuration information of the benefited UE to the benefited UE, so that the benefited UE configures a cooperative layer of the benefited UE according to the cooperative layer configuration information;

deliver data to the current related AP, so that the current related AP forwards the data to the current support AP according to the at least one of identifier or address information of the benefited UE, and the current support AP sends the data to the benefited UE;

detect whether the benefited UE moves to a new support AP;

send a message comprising cooperative layer configuration information and cooperative bearer configuration information of the new support AP to the new support AP after the processor detects that the benefited UE moves to the new support AP, so that the new support AP configures a cooperative layer and a cooperative bearer of the new support AP according to the cooperative layer configuration information and cooperative bearer configuration information of the new support AP;

send the at least one of identifier or address information of the benefited UE to new related APs, wherein the new related APs refer to at least one AP that performs multiple users cooperative communication with the new support AP;

send a message comprising cooperative layer update information of the benefited UE to the benefited UE, so that the benefited UE updates the cooperative layer of the benefited UE according to the cooperative layer update information of the benefited UE;

deliver data to the new related APs after the processor detects that the benefited UE moves to the new support AP, so that the new related APs forward the data to the new support AP according to the at least one of identifier or address information of the benefited UE, and the new support AP sends the data to the benefited UE;

confirm whether the new related APs are the same as the current related APs; and send a message comprising information for deleting the at least one of identifier or address information of the benefited UE to a part of APs that are in the current related APs and different from the new related APs when the processor confirms that the new related APs are the same as a part of APs in the current related APs, so that the part of APs that are in the current related APs and different from the new related APs delete the at least one of identifier or address information of the benefited UE, or send a message comprising the information for deleting the at least one of identifier or address information of the benefited UE to each AP in the current related APs when the processor confirms that the new related APs are different from the current related APs, so that each AP in the current related APs deletes the at least one of identifier or address information of the benefited UE.

8. The device according to claim 7, wherein the evolved NodeB device is further configured to:

send a message comprising cooperative layer and cooperative bearer delete information of the current support AP to the current support AP, so that the current support AP deletes the cooperative layer and cooperative bearer configurations of the current support AP.

9. An access point (AP) device for use in performing multiple users cooperative communication with a support AP of a benefited user equipment (UE), the AP device comprising:

a receiver, configured to receive at least one of identifier or address information of the benefited UE sent by an evolved NodeB (eNB) and receive data sent by the eNB;

a storage, configured to store a correspondence table of an address of the support AP and the at least one of identifier or address information of the benefited UE; and a transmitter, configured to:

acquire the correspondence table of the address of the support AP and the at least one of identifier or address information of the benefited UE from the storage;

search for address information of the support AP in the correspondence table of the address of the support AP and the at least one of identifier or address information of the benefited UE; and send the data received by the receiver to the support AP according to the at least one of identifier or address information of the benefited UE received by the receiver, so that the support AP sends the data to the benefited UE by directly forwarding the data to the support AP according to the address information of the support AP, or forwarding the data to another AP device that performs multiple users cooperative communication with the support AP, so that the data reaches the support AP after one or more times of forwarding between AP devices.

10. The device according to claim 9, wherein:

the receiver is further configured to receive a message that comprises information for deleting the at least one of identifier or address information of the benefited UE and is sent by the eNB; and the processor is configured to delete the at least one of identifier or address information of the benefited UE according to the information that is for deleting the at least one of identifier or address information of the benefited UE and is received by the receiver.

11. A non-transitory computer-readable storage medium storing executable instructions that, when executed, cause at least one processor of an evolved NodeB device to:

send a message comprising cooperative layer configuration information and cooperative bearer configuration information of a current support access point (AP) to the current support AP of a benefited user equipment (UE), wherein the current support AP configures a cooperative layer and cooperative bearer of the current support AP according to the cooperative layer configuration information and cooperative bearer configuration information;

send at least one of identifier or address information of the benefited UE to current related AP, wherein the current related AP refers to at least one AP that performs multiple users cooperative communication with the current support AP;

send a message comprising cooperative layer configuration information of the benefited UE to the benefited UE, so that the benefited UE configures a cooperative layer of the benefited UE according to the cooperative layer configuration information;

deliver data to the current related AP, so that the current related AP forwards the data to the current support AP according to the at least one of identifier or address information of the benefited UE, and the current support AP sends the data to the benefited UE;

detect whether the benefited UE moves to a new support AP;

send a message comprising cooperative layer configuration information and cooperative bearer configuration information of the new support AP to the new support AP after the processor detects that the benefited UE moves to the new support AP, so that the new support AP configures a cooperative layer and a cooperative bearer of the new support AP according to the cooperative layer configuration information and cooperative bearer configuration information of the new support AP;

send the at least one of identifier or address information of the benefited UE to new related APs, wherein the new related APs refer to at least one AP that performs multiple users cooperative communication with the new support AP;

send a message comprising cooperative layer update information of the benefited UE to the benefited UE, so that the benefited UE updates the cooperative layer of the benefited UE according to the cooperative layer update information of the benefited UE;

deliver data to the new related APs after the processor detects that the benefited UE moves to the new support AP, so that the new related APs forward the data to the new support AP according to the at least one of identifier or address information of the benefited UE, and the new support AP sends the data to the benefited UE;

confirm whether the new related APs are the same as the current related APs; and send a message comprising the information for deleting the at least one of identifier or address information of the benefited UE to a part of APs that are in the current related APs and different from the new related APs when the processor confirms that the new related APs are the same as a part of APs in the current related APs, so that the part of APs that are in the current related APs and different from the new related APs delete the at least one of identifier or address information of the benefited UE, or send a message comprising the information for deleting the at least one of identifier or address information of the benefited UE to each AP in the current related APs when the processor confirms that the new related APs are different from the current related APs, so that each AP in the current related APs deletes the at least one of identifier or address information of the benefited UE.

12. A non-transitory computer-readable storage medium storing executable instructions that, when executed, cause at least one processor of an access point (AP) device to:
  receive at least one of identifier or address information of a benefited UE sent by an evolved NodeB (eNB) and receive data sent by the eNB;
  store a correspondence table of an address of a support AP and the at least one of identifier or address information of the benefited UE;
  acquire the stored correspondence table of the address of the support AP and the at least one of identifier or address information of the benefited UE;
  search for address information of the support AP in the stored correspondence table of the address of the support AP and the at least one of identifier or address information of the benefited UE; and
  send the received data to the support AP according to the at least one of identifier or address information of the benefited UE, so that the support AP sends the data to the benefited UE by
    directly forwarding the data to the support AP according to the address information of the support AP, or
    forwarding the data to another AP device that performs multiple users cooperative communication with the support AP, so that the data reaches the support AP after one or more times of forwarding between AP devices.

* * * * *